US007636784B2

(12) United States Patent
Eftis et al.

(10) Patent No.: US 7,636,784 B2
(45) Date of Patent: Dec. 22, 2009

(54) SYSTEM AND METHOD FOR MAINTAINING PRESENCE AND COMMUNICATING OVER A COMPUTER NETWORK USING THE HTTP PROTOCOL

(75) Inventors: Paul S. Eftis, Alexandria, VA (US); Oleg Panashchenko, Gaithersburg, MD (US)

(73) Assignee: PlanetExchange.com, Inc.

( * ) Notice: Subject to any disclaimer, the term of this patent is extended or adjusted under 35 U.S.C. 154(b) by 0 days.

(21) Appl. No.: 11/619,925

(22) Filed: Jan. 4, 2007

(65) Prior Publication Data

US 2007/0112966 A1 May 17, 2007

Related U.S. Application Data

(62) Division of application No. 09/709,909, filed on Nov. 9, 2000, now Pat. No. 7,171,473.

(60) Provisional application No. 60/165,917, filed on Nov. 17, 1999.

(51) Int. Cl.
*G06F 15/16* (2006.01)
(52) U.S. Cl. ........................ 709/227; 709/229; 709/224; 709/204
(58) Field of Classification Search .......... 709/227, 709/224, 228, 229, 217, 204, 219; 705/26, 705/1; 715/500.1, 1; 379/265.09; 370/356
See application file for complete search history.

(56) References Cited

U.S. PATENT DOCUMENTS

| 5,974,453 | A | | 10/1999 | Andersen et al. |
| 6,006,266 | A | * | 12/1999 | Murphy et al. ............... 709/227 |
| 6,026,441 | A | | 2/2000 | Ronen |
| 6,085,242 | A | | 7/2000 | Chandra |
| 6,104,789 | A | | 8/2000 | Lund |
| 6,131,095 | A | | 10/2000 | Low et al. |
| 6,721,713 | B1 | * | 4/2004 | Guheen et al. ................. 705/1 |
| 6,785,708 | B1 | * | 8/2004 | Busey et al. ................ 709/204 |
| 6,934,381 | B1 | * | 8/2005 | Klein et al. ............ 379/265.09 |
| 6,937,597 | B1 | * | 8/2005 | Rosenberg et al. .......... 370/356 |
| 7,139,813 | B1 | * | 11/2006 | Wallenius ................... 709/219 |
| 7,165,213 | B1 | * | 1/2007 | Busey ...................... 715/500.1 |
| 2001/0032254 | A1 | * | 10/2001 | Hawkins ..................... 709/219 |
| 2002/0133412 | A1 | * | 9/2002 | Oliver et al. .................. 705/26 |
| 2003/0061354 | A1 | * | 3/2003 | Burg et al. .................. 709/227 |

OTHER PUBLICATIONS

PCT International Search Report for PCT/US00/31601 mailed Mar. 13, 2001.

* cited by examiner

*Primary Examiner*—Le Luu

(57) ABSTRACT

A computer-implemented process facilitates communication with an entity over a network. A static HTTP URL is associated with the entity. Communications information reflecting the entity's current online presence including the entity's dynamic session information as determined using the HTTP protocol is linked with the URL. Communication with the entity is facilitated using the URL and the communications information. The forms of communication facilitated include type chat/instant messaging, voice communication over a computer network, video communication over a computer network, voice communication from a computer network to a telephone network and two-way text messaging to Internet enabled wireless devices.

40 Claims, 21 Drawing Sheets

USER TABLE

TIME: 10:00AM

| USER_1 | USER IP: A.B.C.D.<br>HOST BOX IP: E.F.G.H.<br>PORT NUMBER: 80<br>SESSION ID: 1 |
|---|---|
| USER_2 | USER IP: I.J.K.L<br>HOST BOX IP: E.F.G.H<br>PORT NUMBER: 80<br>SESSION ID: 2 |
| USER_3 | USER IP: M.N.O.P.<br>HOST BOX IP: Q.R.S.T.<br>PORT NUMBER: 80<br>SESSION ID: 3 |
| ... | ... ... |

FIG. 9

USER TABLE

TIME: 3:00PM

| USER_1 | USER IP: U.V.W.X. <br> HOST BOX IP: Q.R.S.T. <br> PORT NUMBER: 80 <br> SESSION ID: 4 |
|---|---|
| USER_2 | USER IP: I.J.K.L <br> HOST BOX IP: E.F.G.H <br> PORT NUMBER: 80 <br> SESSION ID: 2 |
| USER_4 | USER IP: Y.Z.A.B. <br> HOST BOX IP: E.F.G.H. <br> PORT NUMBER: 80 <br> SESSION ID: 5 |
| ... | ... ... |

FIG. 10

SYSTEM AND METHOD FOR MAINTAINING PRESENCE AND COMMUNICATING OVER A COMPUTER NETWORK USING THE HTTP PROTOCOL

CROSS REFERENCE TO RELATED APPLICATIONS

This application is a divisional of U.S. application Ser. No. 09/709,909 filed Nov. 9, 2000, which claims the benefit under 35 U.S.C. § 119(e) of U.S. provisional application Ser. No. 60/165,917, filed Nov. 17, 1999, the disclosure of which is incorporated herein by reference in its entirety.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

The present invention relates generally to a system and method for maintaining presence and communicating over a computer network using the HTTP protocol. More particularly, the present invention relates to a system and method for maintaining communications information reflecting current online presence including dynamic session information as determined using the HTTP protocol and using the communications information to facilitate communication over the computer network.

The usage of computer networks, particularly the Internet, has grown dramatically and is expected to continue to grow at a rapid pace. This surge in network usage has brought with it a corresponding increase in the prevalence and importance of real-time network communications methods such as instant messaging/type chat, voice over Internet protocol (VoIP) and video over Internet protocol. These methods and similar ones will play an increasingly important role in the way computers and people communicate.

In order for two computers to communicate using the Internet, a calling computer must know or be able to discover at least an Internet Protocol UP) address of a callee. The Domain Name System (DNS) facilitates this process by resolving (i.e., translating or converting) a "friendly name" (i.e., a recognizable set of characters rather than a numerical IP address) into a corresponding IP address. Thus, human users generally do not need to know or even see the underlying IP address associated with computers connected to the Internet or other computer networks.

Many Internet users access the network using a personal computer (PC) and an Internet Service Provider (ISP). It is a common practice for an ISP to dynamically assign an IP address that is valid only during the interval in which the PC is connected to the ISP. Furthermore, there is no static identifier associated with the computer and available through DNS. Accordingly, in many instances, users do not know their own dynamically assigned Internet address, nor do they have a DNS name assigned to their computer. As a result, most Internet users are unable to supply any static, unique identifier that can be repeatedly used to establish a communications session with their computer via the Internet.

A mechanism referred to as User Location Service (ULS) provides one solution to this problem. ULS includes a dynamic directory containing records that map some unique user identifier to a currently assigned IP address. ULS places no restriction (other than uniqueness) on the selected static name. Individual computers are responsible for contacting and logging in to a ULS server. The act of logging in causes a new ULS record to be created. The ULS record is deleted when the computer logs out of ULS or fails to continue to refresh its record.

Two significant problems with ULS are its inability to scale and the completely non-standard way in which static names are resolved to IP addresses. Using non-standard name resolution techniques prevents pre-existing applications from accessing intermittently connected devices in an automated manner. For example, a ULS identifier string cannot be resolved by DNS or by an individual's web browser software. Existing applications such as web browsers are typically only able to access resources using local file names, actual IP addresses, and DNS names. To contact intermittently connected devices using prior art techniques, the particular ULS server containing the address must be contacted to resolve the address. Thus, ULS registered devices are typically not directly accessible using many existing applications.

The inability to scale well presents even greater problems. A computer wishing to resolve a ULS name has no way of knowing which ULS site may currently contain the proper record. There is no central authority under which all existing ULS sites may be automatically searched. Consequently, an exhaustive search of all available ULS sites is currently required. Worse yet, there is no current mechanism by which an application can determine the total set of ULS sites on a given day. Thus, newly added sites only further complicate an effort to locate a user having an unknown ULS connection.

Dynamic DNS provides another solution. Dynamic DNS is very similar to ULS, except that dynamic DNS associates a static domain name (e.g., usemame.thins.net) with a user's currently assigned IP address. As with ULS, the act of logging in to a dynamic DNS system causes a new DNS record to be created associating the user's static domain name with the user's current IP address. The DNS record is deleted when the computer logs out or fails to continue to refresh its record. In this way, a user desiring to communicate with another user logged in to a dynamic DNS system can perform a standard DNS lookup on that user's static domain name to ascertain the user's current IP address.

By replacing the non-standard name resolution techniques of ULS with standard DNS naming, dynamic DNS solved some of the problems inherent in ULS, However, there are still disadvantages to using dynamic DNS as a means of locating and communicating with an intermittently connected user. First, dynamic DNS only provides a user's current IP address. It does not provide complete dynamic session information for a user, including such information as a user's host box identifier, TCP port number on which to be reached, and session ID. Knowledge of a user's complete dynamic session information facilitates the use of multiple possible forms of communication (e.g., type chat, voice, video, etc.).

Second, knowledge of a user's dynamic IP address through dynamic DNS only allows for limited forms of communication. For example, a user can take an IP address and communicate using an H323 protocol communications application such as Microsoft NetMeeting. A user could not, however, type the IP address into a web browser and communicate using the HTTP protocol. The inability to allow HTTP communications is particularly disadvantageous in that HTTP communications can take place even with users located behind firewalls and proxy servers—security measures that are growing more and more prevalent today. By contrast, H323 communications will not easily function through a firewall, unless application modifications are made.

Existing type chat/instant messaging applications are also disadvantageous in that they do not operate using the HTTP protocol. These applications typically require the download of large software programs that operate using proprietary formats that are incompatible with one another, precluding the interoperability of the various applications. Moreover, the applications do not transmit messages using the HTTP protocol. Indeed, some do not even send messages using Transmission Control Protocol/Internet Protocol (TCP/IP), the transport protocol underlying the HTTP protocol and most other Internet transmissions, but instead use User Datagram Protocol (UDP). These type chat/instant messaging applications therefore do not function behind most firewalls and proxy servers.

There is thus a need for a communications system that will allow the association of a static name with a user's complete dynamic session information. There is also a need for a communications system that will facilitate multiple forms of communication with a user given knowledge of only the user's static name. There is also a need for a communications system that will facilitate multiple forms of communication using the HTTP protocol, and thus will allow communication with users and devices located behind firewalls and proxy servers.

SUMMARY OF THE INVENTION

Briefly stated, the present invention provides a computer-implemented method of facilitating communication with an entity over a network. In the method, a static HyperText Transfer Protocol (HTTP) Universal Resource Locator (URL) is associated with the entity. The URL is linked with communications information reflecting the entity's current online presence including the entity's dynamic session information as determined using the HTTP protocol. Communication with the entity is facilitated using the URL and the communications information.

In another embodiment, the present invention provides a computer-implemented method of facilitating communication over a network with one or more members of a group of entities, the group comprising a plurality of entities. In the method, a static HTTP URL is associated with the group of entities. The URL is linked with communications information reflecting each of the members' current online presence including each of the members' dynamic session information as determined using the HTTP protocol. Communication with one or more members of the group is facilitated using the URL and the communications information.

In yet another embodiment, the present invention provides a computer-implemented method of determining the current online presence of an entity on a computer network. In the method, a static HTTP URL is associated with the entity. The URL is linked with communications information reflecting the entity's current online presence including the entity's dynamic session information as determined using the HTTP protocol. The current online presence of the entity is determined using the URL and the communications information.

In yet another embodiment, the present invention provides a computer-implemented method for detecting and maintaining an entity's current online presence on a computer network, the network including a host computer. In the method, an HTTP request is sent from the entity to the host computer to initiate an HTTP connection between the entity and the host computer. Next, the request is received at the host computer and a socket is opened and maintained for the HTTP connection with the entity in a non-blocking manner without a new thread being created for the HTTP connection.

Finally, at least one byte of data is sent from the host computer to the socket at a specified interval to keep open the HTTP connection with the entity.

In yet another embodiment, the present invention provides a computer-implemented method for detecting and maintaining the current online presence on a computer network of a plurality of entities, the network including a host computer. In the method, a request is received at the host computer from one of the plurality of entities to establish an HTTP connection. Next, a socket is opened and maintained for the HTTP connection in a non-blocking manner, the socket having a socket file descriptor, with the one of the plurality of entities without a new thread being created for the HTTP connection. Next, the socket file descriptor is added to a socket database, the socket database maintaining a list of open sockets with those of the plurality of entities that are currently online. Finally, at least one byte of data is sent from the host computer to the open sockets in the socket database at a specified interval to keep open the HTTP connections with the plurality of entities.

In yet another embodiment, the present invention provides a computer-implemented method of sending text messages from a first entity to a second entity over a network using HTTP, the network including a host computer. In the method, a socket and an HTTP connection between the second entity and the host computer is established and maintained. Next, a text message is sent from the first entity to the host computer to be delivered to the second entity. Finally, the text message is sent to the second entity from the host computer using the socket and the HTTP connection.

In yet another embodiment, the present invention provides a computer-implemented method of transporting Session Initiation Protocol (SIP) messages from a first entity to a second entity over a network, the network including a host computer. In the method, a socket and an HTTP connection between the second entity and the host computer is established and maintained. Next, a SIP message is sent from the first entity to the host computer to be delivered to the second entity. Finally, the SIP message is sent to the second entity from the host computer using the socket.

Finally, in yet another embodiment, the present invention provides a computer-implemented method of sending text messages from an entity to an Internet enabled wireless device over a network, the network including a host computer. In the method, a communications request is sent to the Internet enabled wireless device from the host computer that includes an URL identifying the host computer. A socket and an HTTP connection between the Internet enabled wireless device and the host computer is established and maintained using the URL. Next, a text message is sent from the entity to the host computer to be delivered to the Internet enabled wireless device. Finally, the text message is sent to the Internet enabled wireless device from the host computer using the socket and the HTTP connection.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown. In the drawings:

FIG. 9 is a portion of a UserTable in a preferred embodiment of the present invention;

FIG. 10 is a portion of a UserTable in a preferred embodiment of the present invention;

Figure 12:
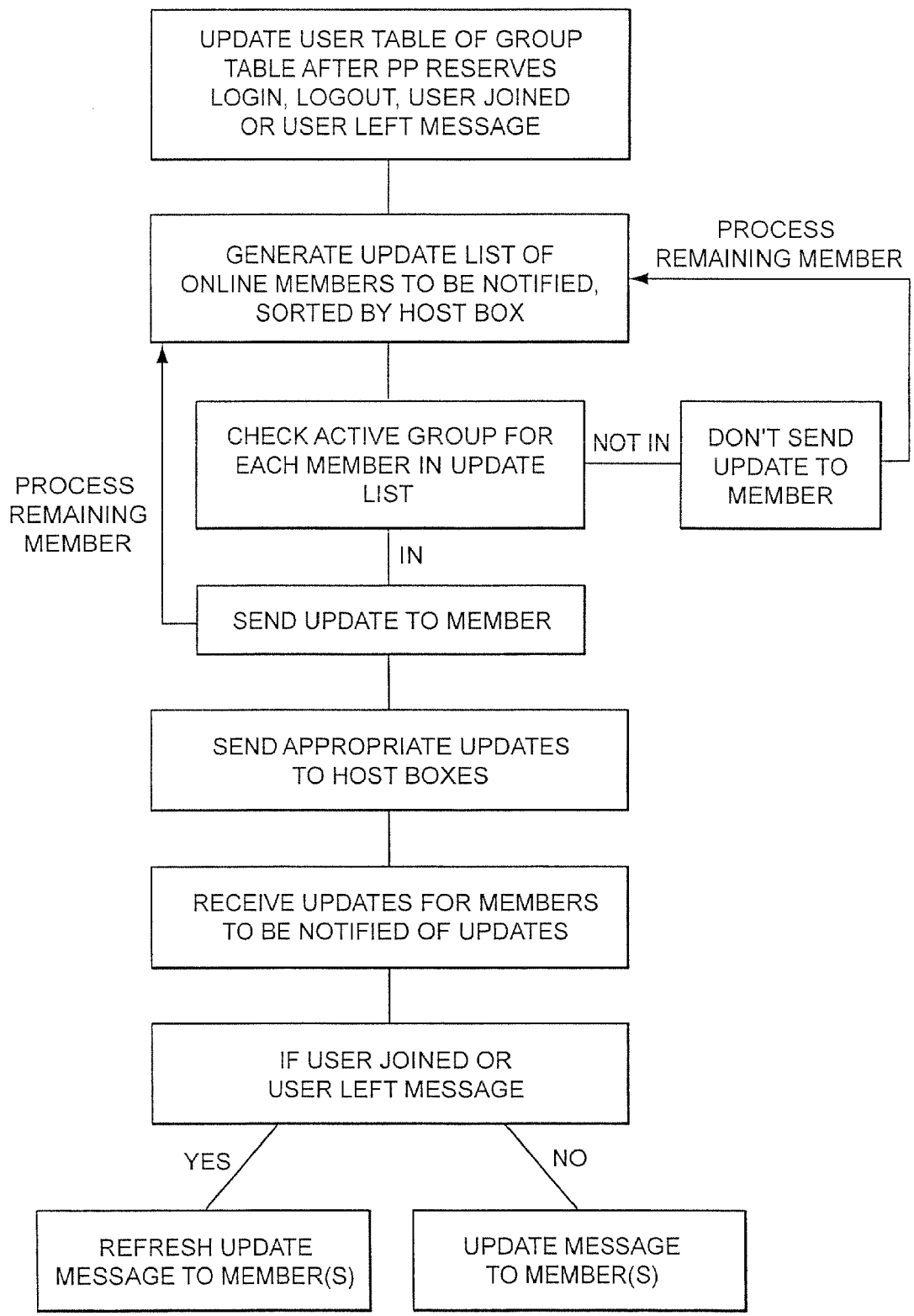
Figure 13:
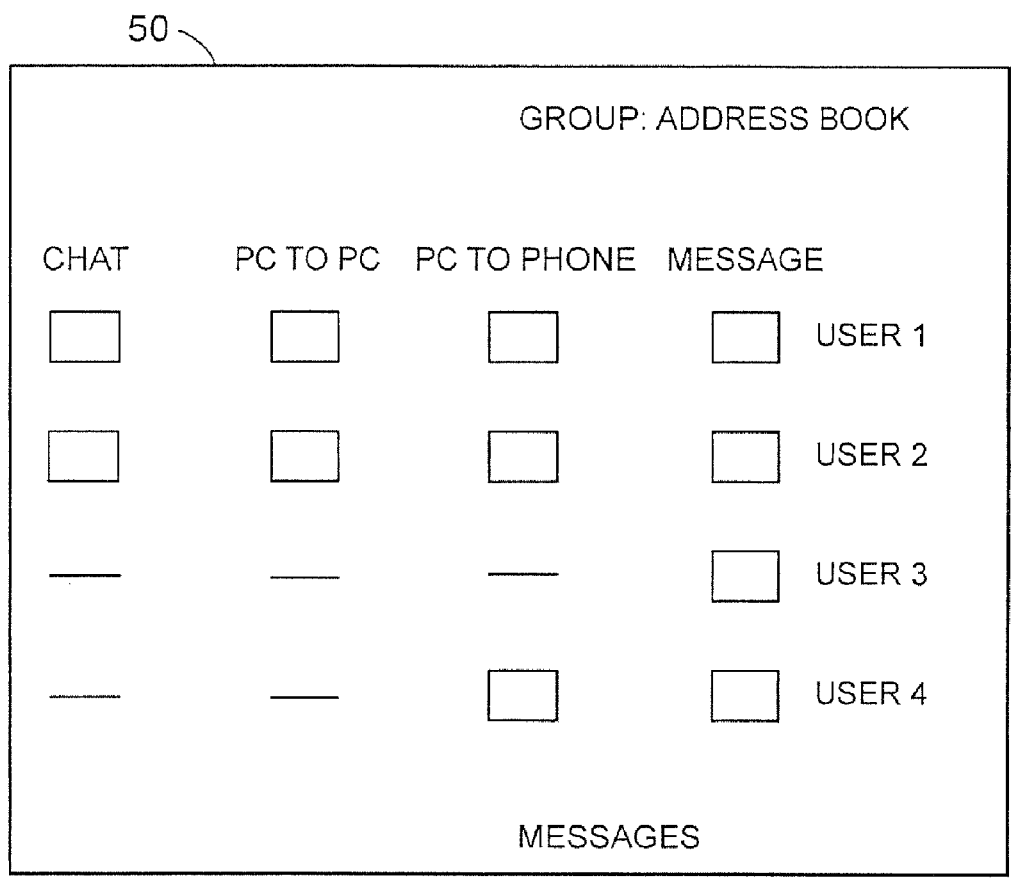
Figure 14A:
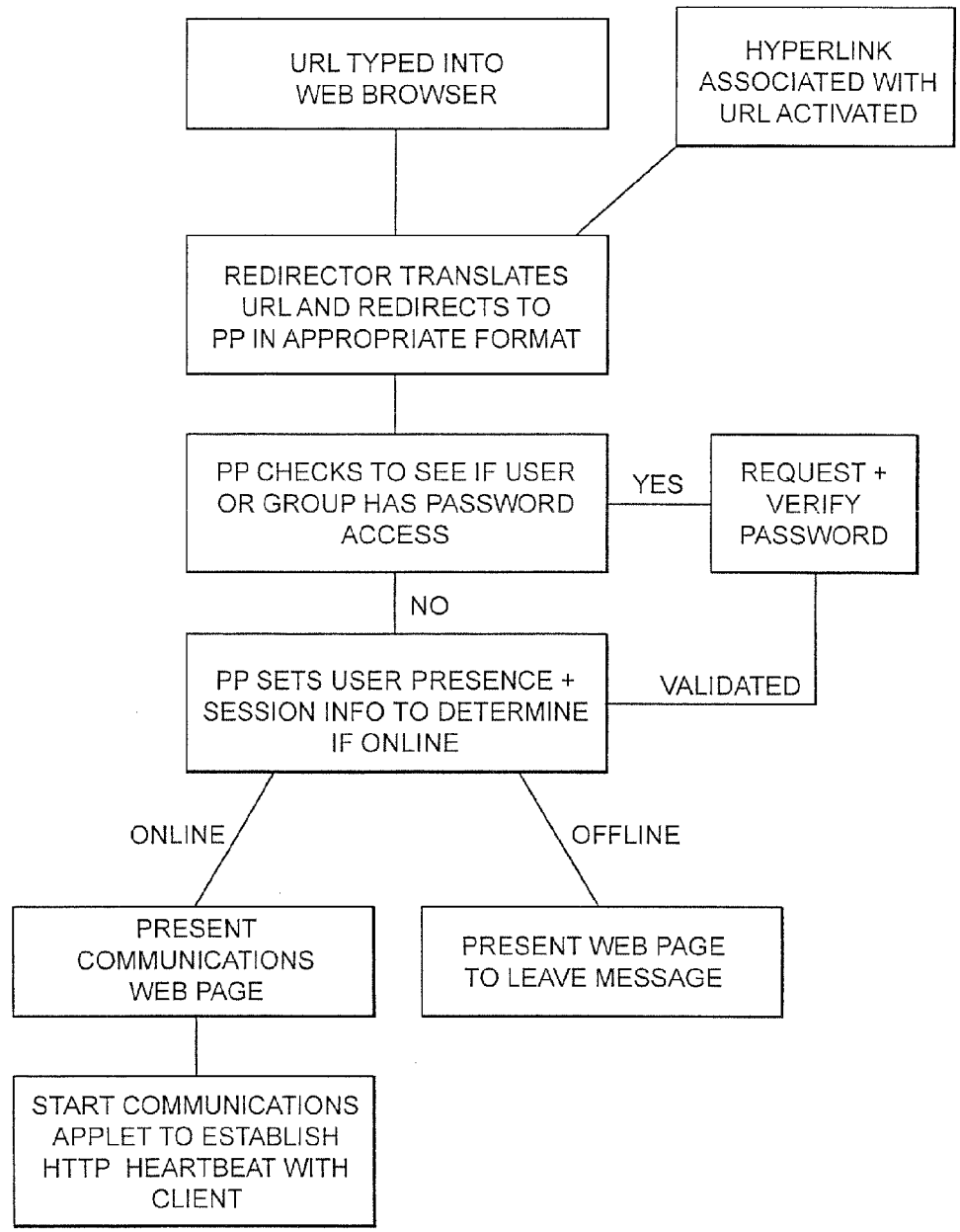
Figure 14B:
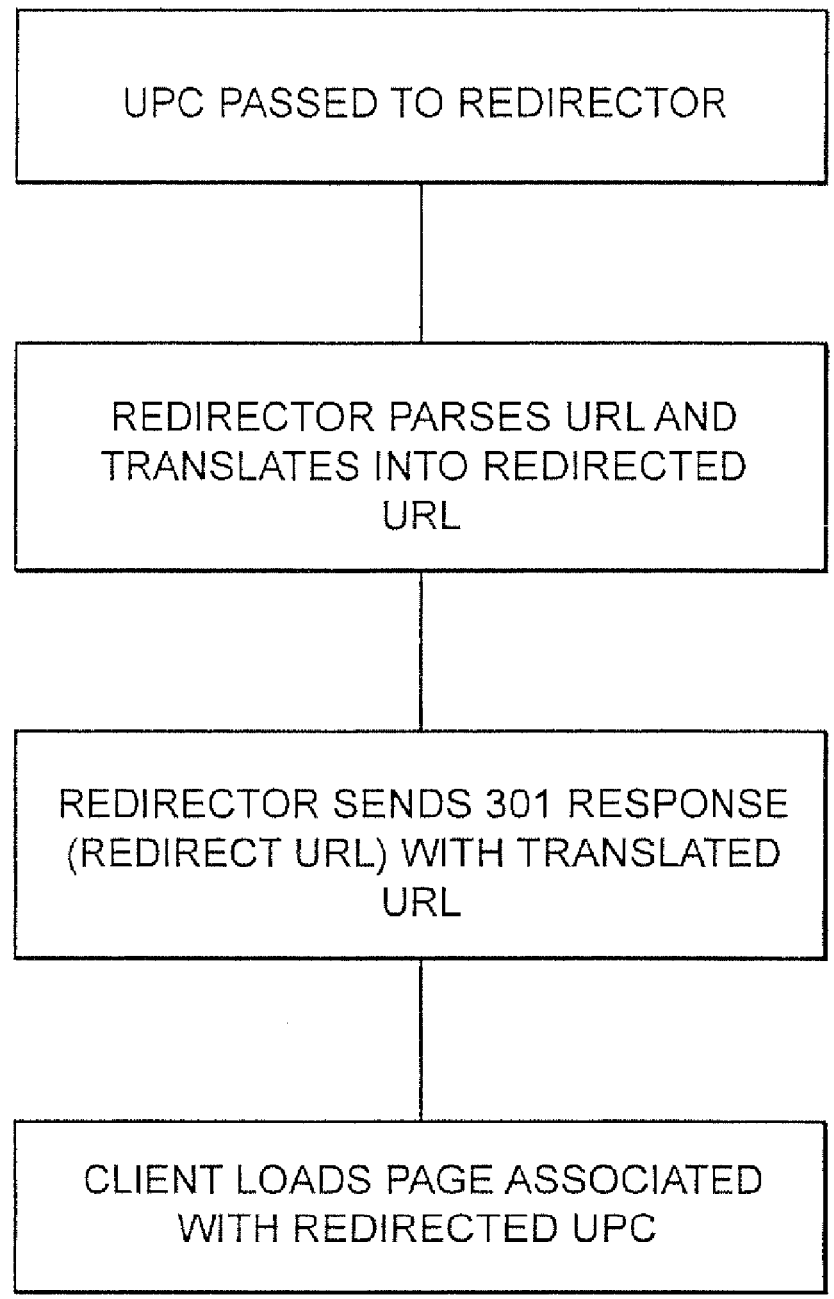
Figure 15:
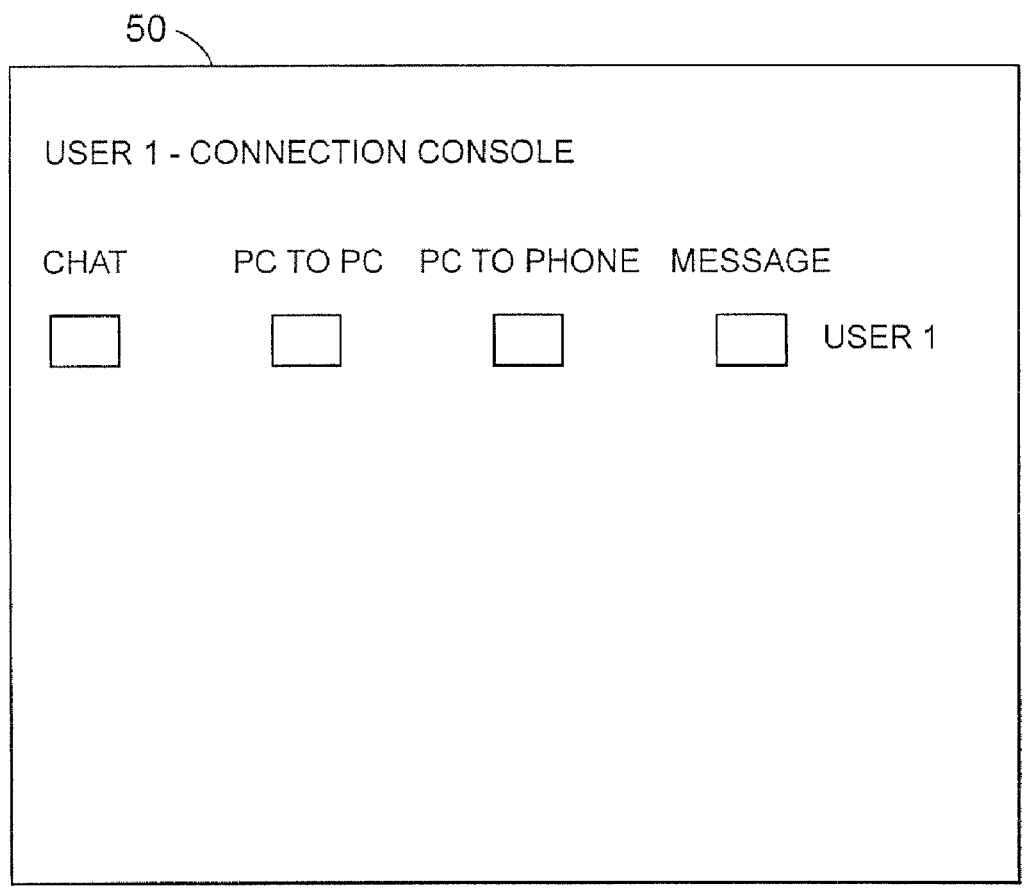
Figure 16:
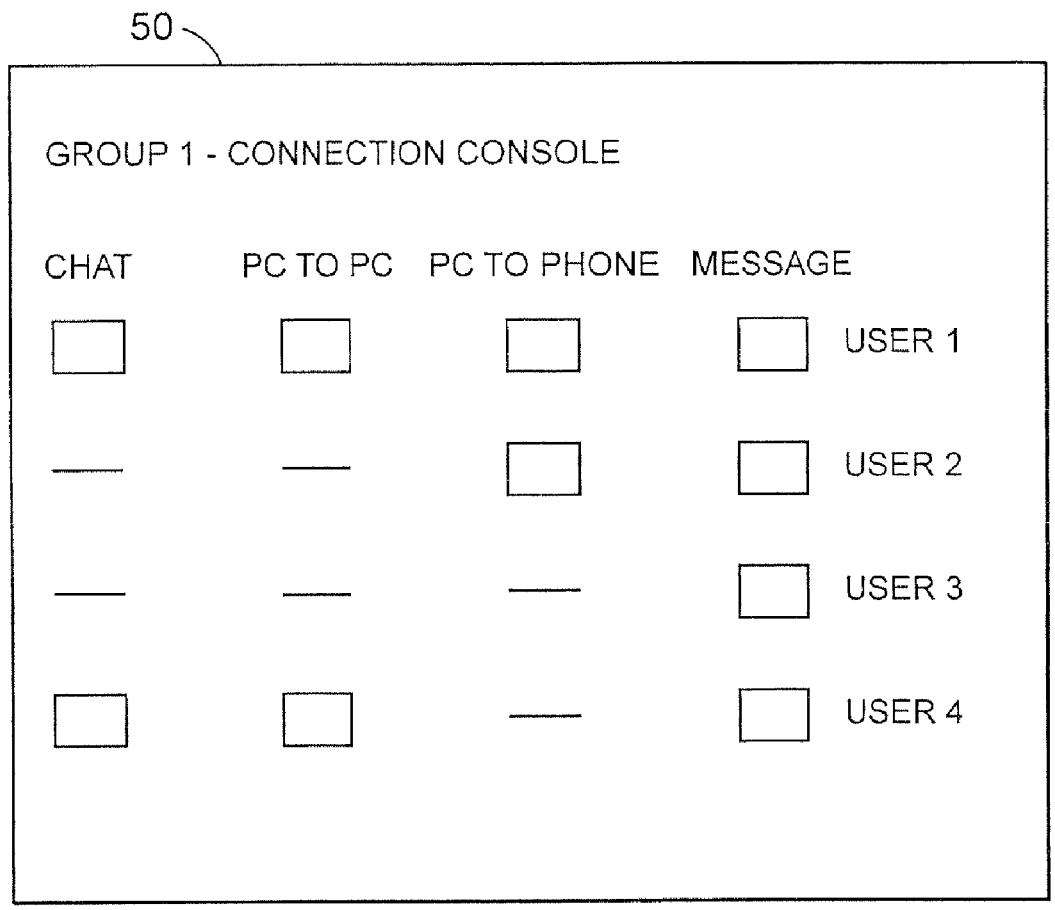
Figure 17:
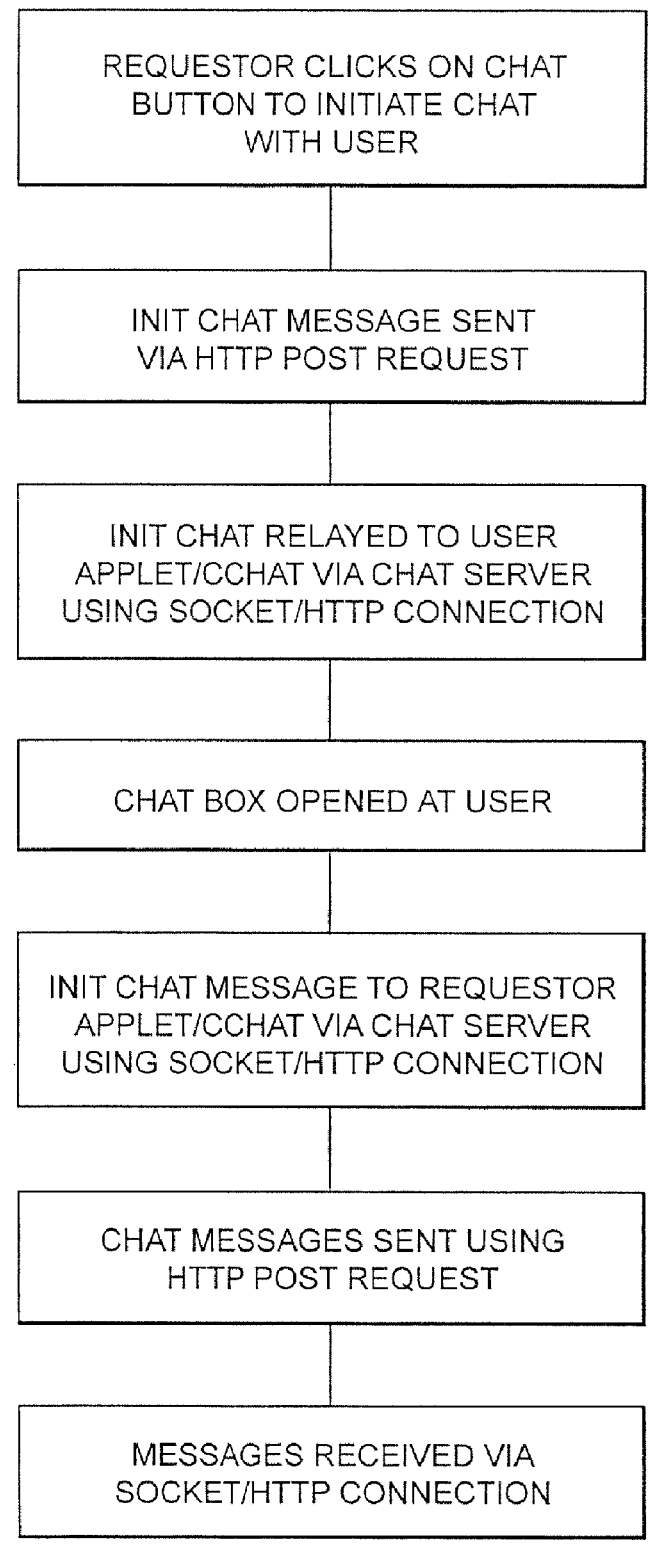
Figure 18:
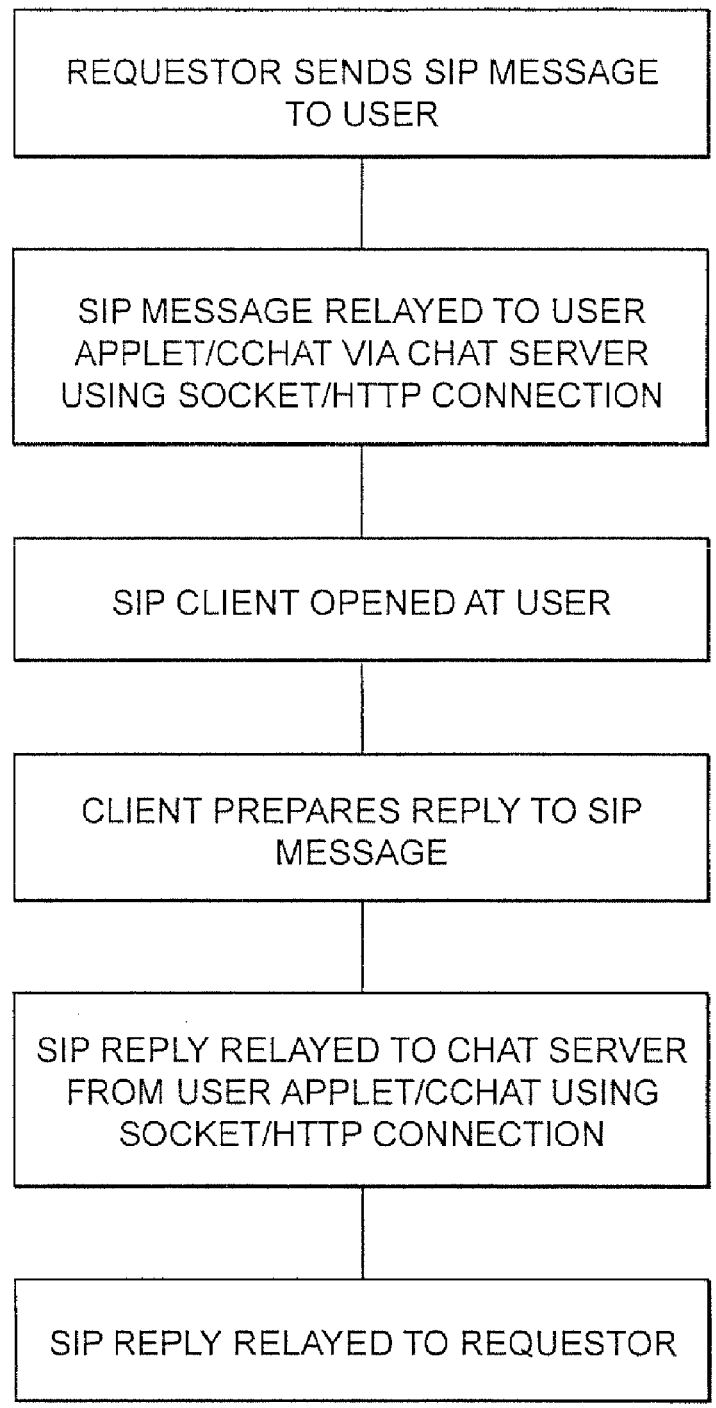
Figure 19:
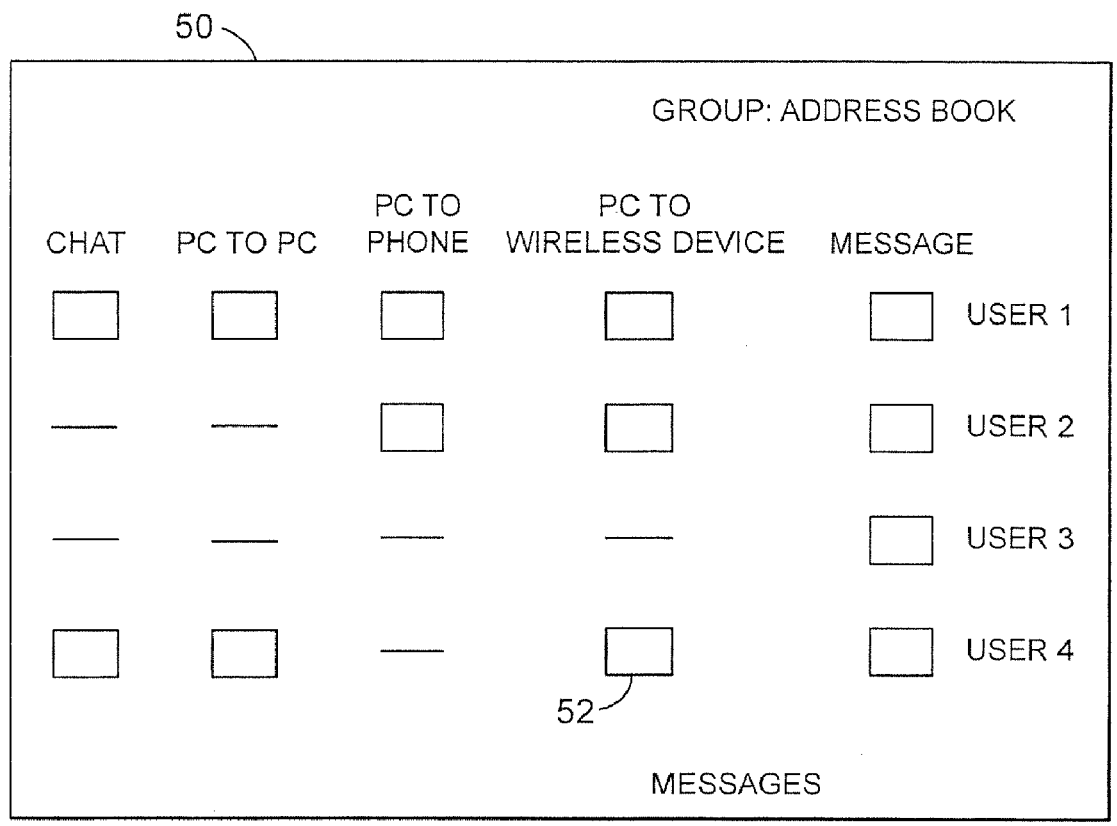
Figure 20:
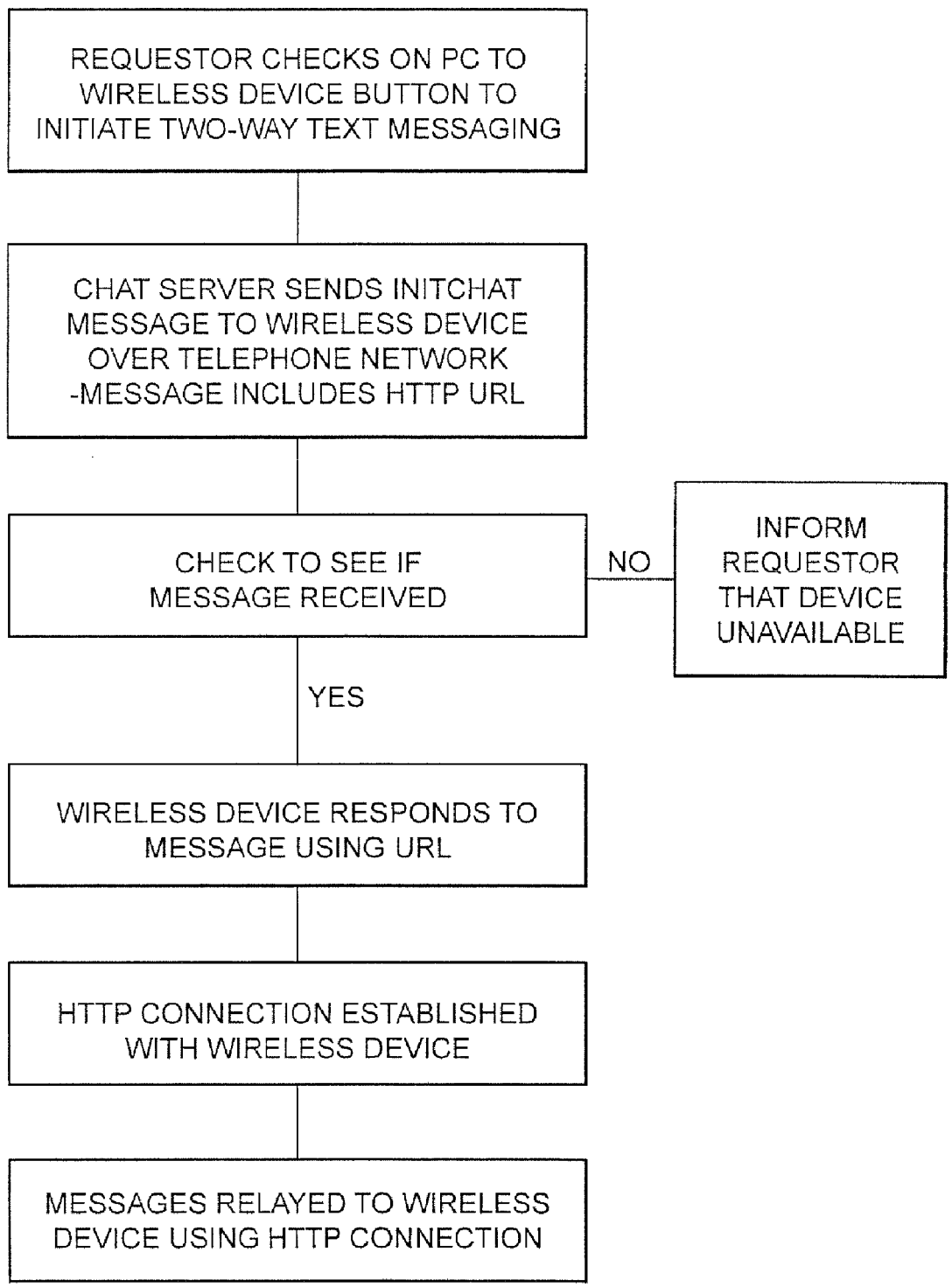

FIG: 11 is a sample communications web page displayed to a registered user of a preferred embodiment of the present invention;

FIG. 12 is a functional flowchart of the steps to update a communications web page displayed to a registered user of a preferred embodiment of the present invention;

FIG. 13 is a sample communications web page displayed to a registered user of a preferred embodiment of the present invention;

FIG. 14A is a functional flowchart of the steps to display a communications web page to a requesting entity using a preferred embodiment of the present invention;

FIG. 14B is a functional flowchart of the steps to redirect an URL using a preferred embodiment of the present invention;

FIG. 15 is a sample communications web page displayed to a requesting entity using a preferred embodiment of the present invention;

FIG. 16 is a sample communications web page displayed to a requesting entity using a preferred embodiment of the present invention;

FIG. 17 is a functional flowchart of the steps to transport type chat/instant messages using a preferred embodiment of the present invention;

FIG. 18 is a functional flowchart of the steps to transport a SIP message using a preferred embodiment of the present invention;

FIG. 19 is a sample communications web page displayed to a registered user of a preferred embodiment of the present invention; and FIG. 20 is a functional flowchart of the steps to transport two-way text messages to an Internet enabled wireless device using a preferred embodiment of the present invention.

DETAILED DESCRIPTION OF THE INVENTION

Certain terminology is used herein for convenience only and is not to be taken as a limitation on the present invention.

In the drawings, the same reference numerals are employed for designating the same elements throughout the several figures.

The present invention is described in the context of a communications system used to facilitate communication with entities over a computer network such as the Internet or an Intranet. The term "entity" is used herein to mean any type of device with any type of an IP connection (e.g., wired, wireless, etc.) to a network. For example, an entity could be an Internet enabled personal computer (PC), laptop, workstation or other type of computer. An entity could also be an Internet enabled wireless telephone, personal digital assistant (PDA) such as a Palm Pilot, or even an appliance or other household device.

Figure 1:
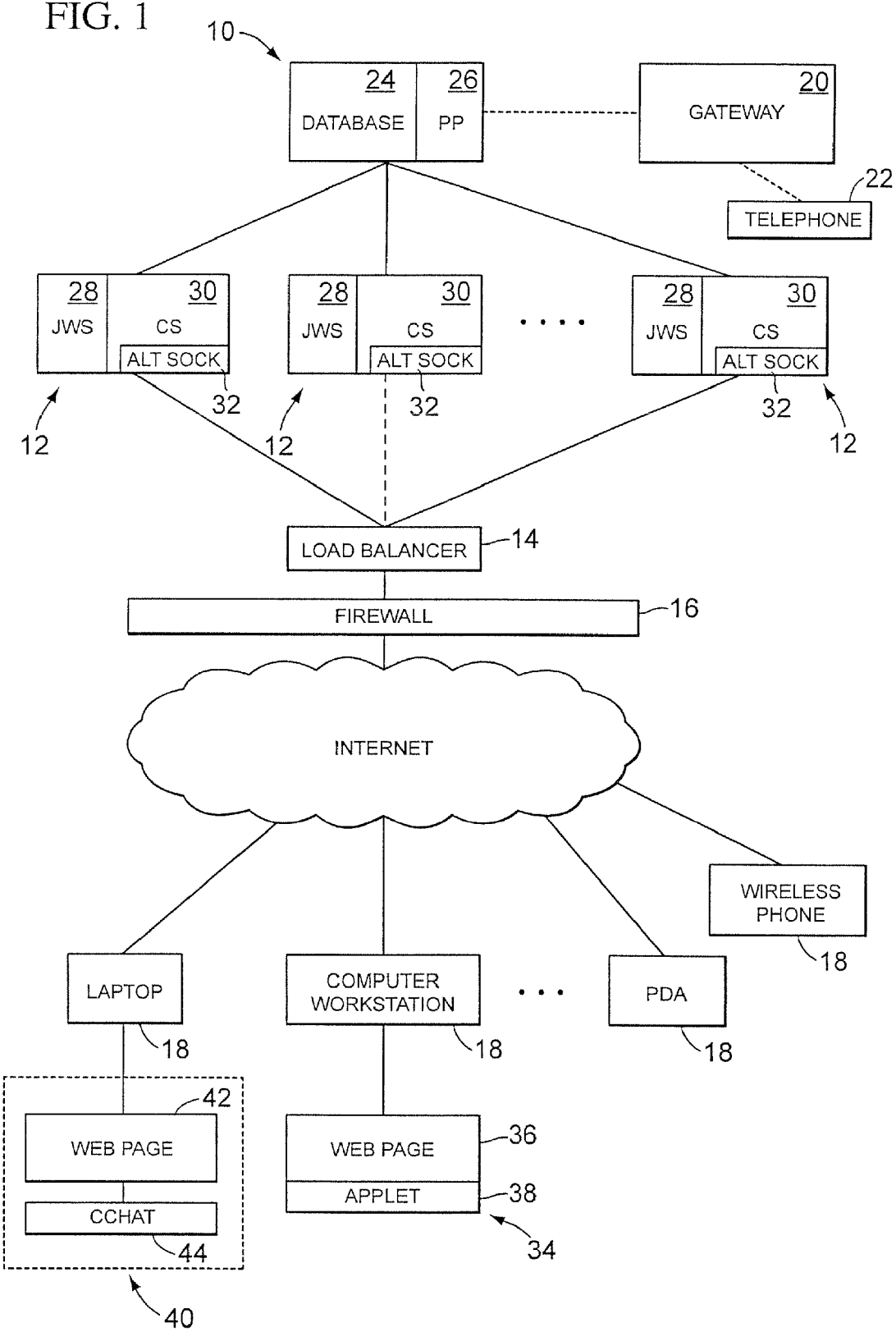
FIG. 1 is a high-level architecture block diagram configuration for one preferred embodiment of the present invention.

Turning to FIG. 1, a high-level architecture block diagram configuration for one preferred embodiment of the communications system of the present invention is shown. A backend server 10 is networked to one or more session manager servers 12. The session manager servers 12, in turn, are preferably networked to a load balancer 14, which is preferably connected to a public network, such as the Internet, through a firewall 16. One or more client devices 18 (i.e., entities) are also connected to the Internet. Additionally, the backend server 10 may be networked to a gateway 20, which can communicate with a telephone 22 using a telephony network (not shown).

The backend server 10 contains two databases and, as will be discussed in detail below, runs the presence propagation (PP) system. The first database 24 is used to store persistent information for the communications system. For example, the first database 24 stores the names and mailing addresses of users of the communications system, the users' usernames and passwords for authentication/verification, the list of groups to which users belong (to be explained below), and possibly other user demographic data. The first database 24 also stores information on the groups that have been defined in the communications system, including a list of the groups that have been defined, passwords for those groups that require them, and a list of the members of each group. The first database 24 can be implemented using any database application, such as Oracle or SQL-based databases. Access to the first database 24 can also be managed through any means. For example, in a Java environment, access can be handled using a Java database connectivity (JDBC) interface.

The second database 26 is used to store non-persistent information for the communications system. The second database 26 primarily consists of two data tables. The first data table contains the dynamic session information (to be explained below) for all users that are currently online. The second data table contains a list of all of the groups that currently have members online, and, for each such group, a list of all of the members that are currently online. Since the information in the second database 26 changes often and the information is accessed frequently, the second database 26 is preferably stored as hash tables in the memory of the backend server 10. The second database 26 could be implemented using any database application. The first database 24 and the second database 26 may be combined into a single database, if desired.

The session manager servers 12 interact with the client devices 18 over the network (e.g., Intranet or Internet). The session manager server 12 includes a web server 28, a chat server 30 and a socket handler 32. The session manager servers 12 preferably communicate with the backend server 10 using an inter-process communications protocol such as Remote Method Invocation (RMI). CORBA could also be used, as could any other communications protocol.

The web server 28 is used to serve web pages and their components to a web browser or other application on a client device 18. The web server 28 can be implemented in any programming language, but is preferably implemented as a Java Web Server (JWS) using, for example, Apache/Resin or WebLogic.

The chat server 30 is used to maintain the online presence (i.e., heartbeat) of client devices 18 through an HTTP connection between the client device 18 and the chat server 30. The chat server 30 is also used to send messages to and receive messages from the client device 18 through the HTTP connection. The chat server 30 can be implemented in any programming language, but is preferably implemented as a Java servlet. Moreover, although shown as a separate process from the web server 28, the chat server 30 and the web server 28 can be combined into a single application.

The chat server 30 also includes a socket handler 32. As will be explained in detail below, the socket handler 32 is used to establish and maintain an HTTP connection between the chat server 30 and the client device 18 without the need of creating a new thread. Accordingly, the chat server 30 can maintain HTTP connections with many client devices 18 using very little overhead. The socket handler 32 can be implemented in any programming language, but is preferably implemented using C++.

One or more session manager servers 12 can be used in the communications system of the present invention. The number of session manager servers 12 used will depend on the anticipated number of users of the system. The higher the level of anticipated users, the more session manager servers 12 that should be used. With server hardware such as a standard Unix server, such as, for example, a Sun E450, it is anticipated that each session manager server 12 can support up to approximately 10,000 simultaneous users.

Any server hardware may be used for the backend server 10 and the session manager servers 12. Preferably, Unix servers are used. Moreover, although shown as separate servers in FIG. 1, the backend server 10 and the session manager 12 could be combined into a single server. Of course, the web server 28 and the chat server 30 could also be broken out into separate servers.

The session manager servers 12 are preferably connected to the Internet or other network using a load balancer 14 and a firewall 16. The load balancer 14 distributes network traffic among the session manager servers 12 so that none of the session manager servers 12 become overburdened. Any conventional load balancer can be used for the load balancer 14, such as, for example, a Foundry Server Iron. The firewall 16 provides security for the session manager servers 12 and the backend server 10, preventing unauthorized access to the servers over the network. Any combination of firewall software and/or hardware can be used for the firewall 16, such as, for example, Check Point Fire Wall.

The gateway 20 is used to provide access to a telephony network. Using the gateway 20, voice data from the communications system of the present invention, such as VoIP, can be sent through a telephony network to a telephone 22. Thus, users of the communications system are able to initiate telephone calls from client devices 18. Any existing gateway technology may be used for the gateway 20, such as, for example, Cisco VoIP routers.

Finally, the client devices 18 are the users of the communications system. As noted above, the client devices 18 can be any entity—namely any type of device with any type of an IP connection (e.g., wired, wireless, etc.) to a network. For example, as shown in FIG. 1, a client device can be a laptop computer, a computer workstation, a PDA or an Internet enabled wireless phone. The client devices 18 interact with the communications system over a network, such as the Internet.

The client devices 18 preferably access the communications system either through a web browser 34 or through a download application 40. First, the communications system can be accessed through any web browser 34, such as Internet Explorer or Netscape Navigator or a Wireless Markup Language (WML)/Handheld Device Markup Language (HDML) browser on an Internet enabled wireless device. As will be explained in detail below, the web browser 34 can display web pages 36 served from the web server 28. Additionally, an applet 38 running on a web page 36 communicates with the chat server 30. The applet 38 is tied to a particular web page 36, and is preferably contained in a hidden frame in the web page 36. It is also possible to use any other functionality in place of the applet 38, such as, for example, an ActiveX control, to communicate with the chat server 30.

Alternatively, a download application 40 can be installed on a client device 18 to allow the client device 18 to access the communications system. The download application 40 has two components. First, the application 40 needs to be able to display web pages 42 served from the web server 28. This can be accomplished either by launching a web browser already resident on the client device 18 or by providing a new application capable of interacting with the web server 28. The download application 40 also contains a CCHAT application 44 that communicates with the chat server 30. The CCHAT application 44 is preferably written in C, although can be written in any programming language, and serves the same function as the applet 38. Unlike the applet 38, however, the CCHAT application 44 is not linked to a particular web page 42.

Now that the overall architecture of a preferred embodiment of the communication system of the present invention has been described, the functionality of the communication system will be discussed. First, the process by which a user establishes and maintains online presence will be discussed.

Initially, a user must register with the communications system. In particular, the user must pick a username and password that will be used to allow the user to log into the system and thus maintain his presence on line. Additionally, the user's username will be used to allow others to communication with the user. For example, as discussed below, the HTTP URL http://pxcall.com/username will allow anyone, whether or not they are registered to use the communications system, to communicate with the user.

Figure 2:
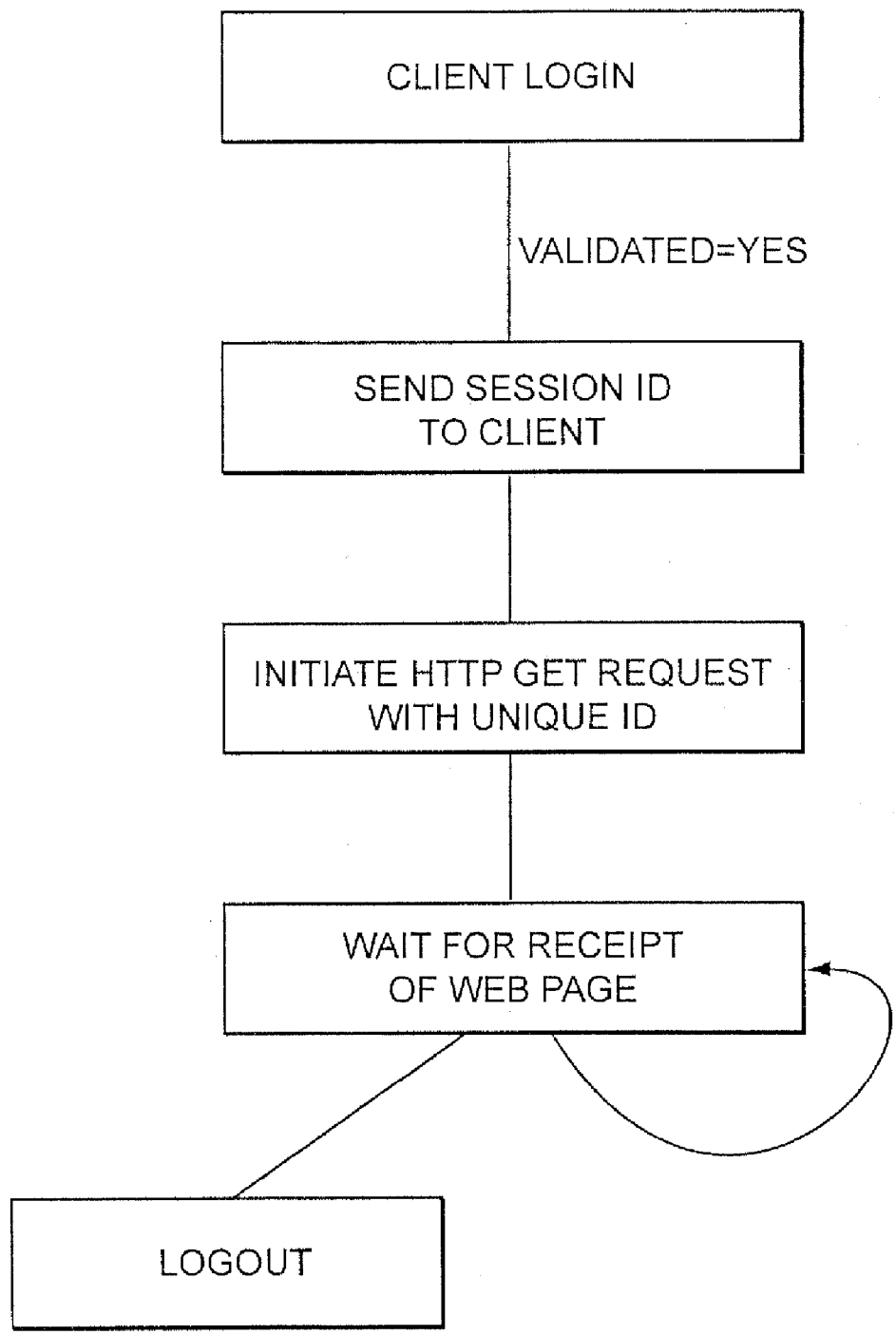
FIG. 2 is a functional flowchart of the steps to establish the online presence of an entity in a preferred embodiment of the present invention.

Once a user has registered with the communications system, the user can exploit the system. FIG. 2 shows the steps taken by a client device 18 to establish and maintain online presence. First, the user logs on to the communication system. If the client device 18 is running a web browser 34, the user enters an HTTP URL, such as http://www.planetexchange.com, and then enters a username and password to log into the system. If the user's username and password are recognized as valid, the session manager server 12 to which the user has been directed sends a web page 36 that includes the applet 38. The session manager server 12 also preferably sends a unique session ID, a large random number that the client device 18 will use in all communications with the session manager server 12. This security measure assures that messages sent to the session manager 12 actually come from the client device 18. After receiving the session ID, the applet 38 initiates an HTTP request—e.g., http://hostboxid/jchat?me=username&id=sessionID . . . , where hostboxid is the IP address of the session manager server 12, me is the user's username, and id is the unique session ID for that current user session—and waits to receive the requested web page. The applet 38 will continue to wait until the user logs out of the system or closes the web page 36 and thus stops the execution of the applet 38. Additionally, as will be discussed below, if a message is sent to the user, it is delivered to the user as an HTTP response to this request. By making an HTTP request, the applet 38 maintains a "virtual" continuous HTTP connection with the session manager server 12. This HTTP connection is what establishes and maintains the online presence of the user. As will be described in detail below, scalability and optimization using this HTTP-based approach for maintaining presence is preferably achieved by maintaining the user connections without creating a new thread to maintain and access each socket connection in a non-blocking manner.

It is also possible to maintain a user's presence (i.e., heartbeat) using HTTP in different manners. For example, multiple HTTP requests can be used to maintain presence by having the applet 38 make periodic HTTP requests to the session manager 12 to establish and maintain the online presence of the user.

Alternatively, the above process can be automated if the client device 18 is using the download application 40. For example, the client device 18 can be set up so that the CCHAT application 44 executes when the client device 18 is turned on. The CCHAT application 44 can then automatically log the client device 18 into the system and then initiate the HTTP request to open an HTTP connection once the CCHAT application 44 receives the session ID from the session manager server 12.

Figure 3:
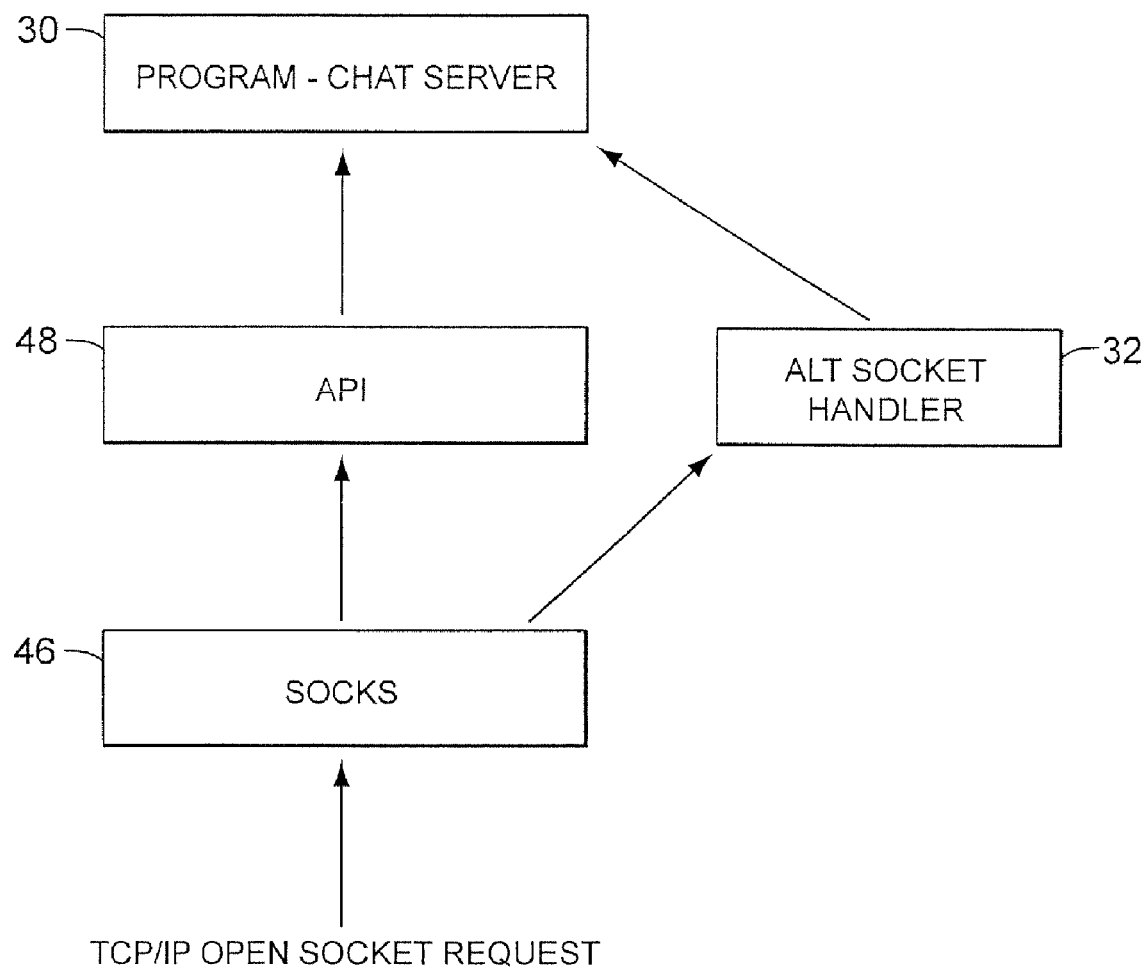
FIG. 3 is a block diagram showing the functioning of a socket handler in a preferred embodiment of the present invention.

FIG. 3 shows how the session manager server 12 handles the HTTP request from the client device 18. The HTTP request initiates a TCP/IP open socket request, which is received by the low-level socket process 46, such as WinSock or Berkeley Sockets, on the session manager server 12. Normally, for the request to be handled in a non-blocking manner, it would proceed through an Application Program Interface (API) layer 48 before being sent to the application that will handle the open socket request, which in this case is the chat server 30. However, if an open socket request is handled in this manner, a new thread (e.g., a lightweight process in Unix, since Unix does not natively allow for threads, just forked processes) is created and maintained for each open socket connection. There is system overhead associated with the creating and maintaining of thousands of threads, which would create problems in scalability, since every user logging into the communications system would result in the creation of an additional thread. Creating and maintaining a new thread with each open socket request would limit the number of simultaneous users per typical session manager server 12 to approximately 3000.

To avoid the overhead associated with the creation of new threads, the communication system of the present invention uses the AltSock socket handler 32. The AltSock socket handler 32 is a shim that handles the open socket request instead of the API 48. The low-level socket process 46 hands the open socket request to the AltSock socket handler 32. The AltSock socket handler 32 accesses the socket simply by referencing its file descriptor in the socket table in the memory of the chat server 30, rather than creating a new thread to maintain and access the socket. Thus, there only needs to be a single thread to access all of the sockets, and thus all of the users, handled by the chat server 30 in a non-blocking manner. Using the socket handler 32, a typical session manager server 12 can handle 10,000 simultaneous users.

The chat server 30 maintains a table in memory of all of the users that are online that it is hosting. For each username, the table contains the socket file descriptor of the HTTP connection for that user, as well as a counter that is used to keep the HTTP connection open. The table also preferably contains the user's dynamic session information, which will be explained below. When a user logs into the system and the socket handler 32 receives an open socket request, a new entry is added to the table in the memory of the chat server 30 reflecting the new user, including dynamic session information, socket file descriptor, and a counter initialized to its start value. As will be discussed below, the username and dynamic session information is also passed to the presence propagation (PP) system so that others will be able to determine whether or not the user is online, and, if so, will be able to communicate with the user.

Figure 4:
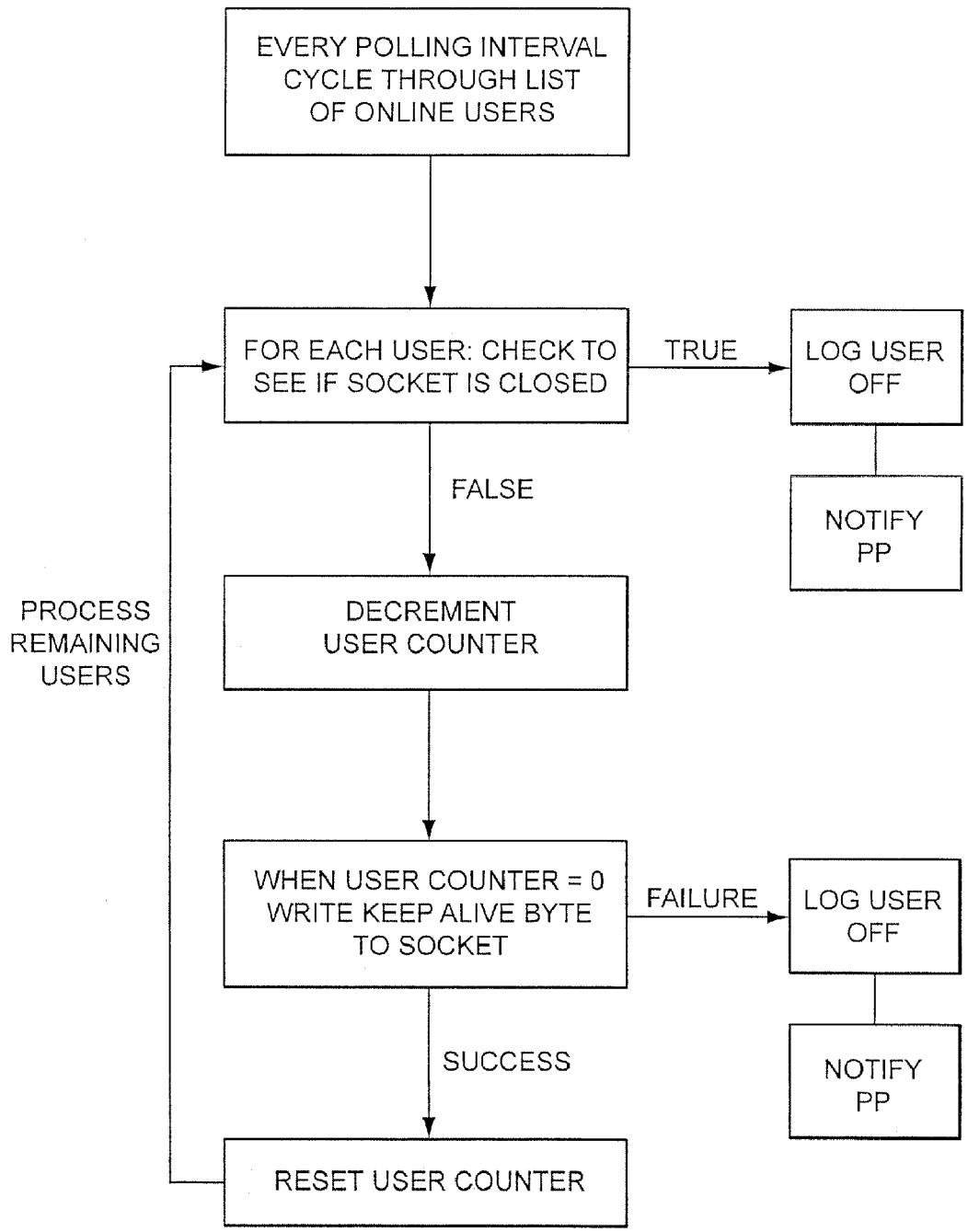
FIG. 4 is a functional flowchart of the steps to maintain the online presence of an entity in a preferred embodiment of the present invention.

FIG. 4 shows how the chat server 30 maintains the HTTP connections with the online users and thus maintains the online presence of those users. Every polling interval, which is preferably every four seconds, the chat server 30 cycles through the list of online users. For each user, the chat server 30 first checks to see if the socket associated with the user is still open. If the socket is not open, the user has logged off and the chat server 30 can remove the user from its table and can notify the PP system that the user has logged off. If the socket is still open, the user's keep-alive counter is decremented. When the counter reaches zero (i.e., the keep-alive interval has been reached, which is preferably 60 or 120 seconds), a byte is written to the socket to keep the socket open, thereby keeping open the HTTP connection with the user. If the write operation fails, then the socket is not open. The user has thus logged off and the chat server 30 can remove the user from its table and can notify the PP system that the user has logged off.

There are thus three ways that a user can be logged out after having logged into the communications system. First, if the user intentionally logs off of the network (e.g., by clicking on a logout link or closing a web browser 34 or CCHAT application 44), a message can be sent from the client device 18 to the chat server 30 to log the user out. If, however, a logout message is not sent to, or not received by, the chat server 30, the user can still be logged out when the chat server determines during a polling interval that the socket associated the user is no longer open or determines during a keep-alive interval that it cannot write to the socket associated with the user.

In the above-described process, the HTTP connection with a user serves as a heartbeat to let the chat server 30 know whether or not the user is still online. Since the heartbeat is created and maintained using an HTTP connection, the heartbeat will function behind any proxy server or firewall that allows HTTP traffic. Most firewalls and proxy servers allow such traffic since there is relatively little danger to a network from HTTP transmissions.

Of course, one could implement the HTTP based heartbeat and • communications using processes other than the presently preferred method described above. For example, a first possible variation incorporates the current implementation without the AltSock socket handler 32. Such a system would still work behind a firewall or proxy. In this variant, the open socket requests are completely handled within the API layer 48, for example within the Java Virtual Machine in a Java implementation, and a new thread is created and maintained for every connection by a client device 18. This method has the undesirable consequence that a given session manager 12 would have to maintain a thread for every connected client device 18.

A second variation uses HTTP as the transport, but uses a different algorithm for heartbeat and connection. In this variation, the user makes periodic HTTP connections to the session manager 12 (perhaps every 5-10 seconds), and the user's presence is determined by the absence of "httping" packets. After a user logs in, periodic "httping" packets are sent to the session manager 12, and a user's presence is deemed online until the packets stop. For example, this system could be implemented by starting a timer when a user logs in. If the timer reaches zero, the user is logged out. Otherwise if a keep-alive/httping packet is received, the timer is reset. This system will work behind a firewall or proxy. However, it is disadvantageous in that there is no way for the session manager 12 to send messages to the user until the user reconnects to the session manager server 12 and provides the connection pipe to communicate. Thus any updates, chats or other messages will be delayed until the next connection cycle. When the user reconnects at the next heartbeat interval, they will receive the messages. More importantly, this system will not scale well at all, as by design it floods itself with TCP connections under large loads.

A third variation uses HTTP to transport some messages, but uses one or more additional TCP connections for additional signaling. In this type of a system, various messages are sent over HTTP transport, and any of the previously mentioned socket handling algorithms or heartbeat mechanisms can be implemented. However, one or more additional TCP connections (such as, for example using Telnet, SSH, or an unassigned TCP Port) is made to the session manager 12, in order to establish authentication, or even to provide heartbeat and message passing. This hybrid HTTP system will not work behind a firewall or proxy without special configurations that compromise the security of the firewall or proxy.

As discussed above, the PP system is notified when a user logs into or out of the communication system. This is important since the PP system running on the backend server 10 plays a central role in the ability of the communications system to allow others to communicate with users of the communications system. The PP system will now be described.

As mentioned above, the second database 26 in the backend server 10 maintains two data tables. The first data table ("UserTable") maintains a list of the dynamic session information for each user that is currently online. This dynamic session information includes:

User IP—the IP address of the entity (i.e., client device 18) from which the user is logged into the communications system.

Host Box Identifier—the IP address of the session manager server 12 that is hosting the user (i.e., the session manager 12 that is maintaining the socket and HTTP connection with the user's client device 18).

Port Number—the TCP port number on the client device 18 through which the HTTP connection is maintained (typically port 80).

The dynamic session information also preferably includes:

Session ID—the unique session ID assigned to the user by the chat server 30.

Group Info—the list of groups to which the user belongs.

Active Group—the group that the user currently has displayed on the client device 18.

The second data table ("GroupTable") maintains a list of the groups that currently have members online together with a list of the members in each group that are currently online. A group is simply a group of users that has been given a defined name in the communications system and which a user is capable of joining. For example, every user has a personal address book—namely, the user's group of contacts that the user wishes to track the online presence of and communicate with. Additionally, groups can be companies, divisions, clubs, etc. Password protection may be set up in the communications system to prevent unauthorized users from joining groups or, as discussed below, displaying the communications page associated with the group.

Figure 5:
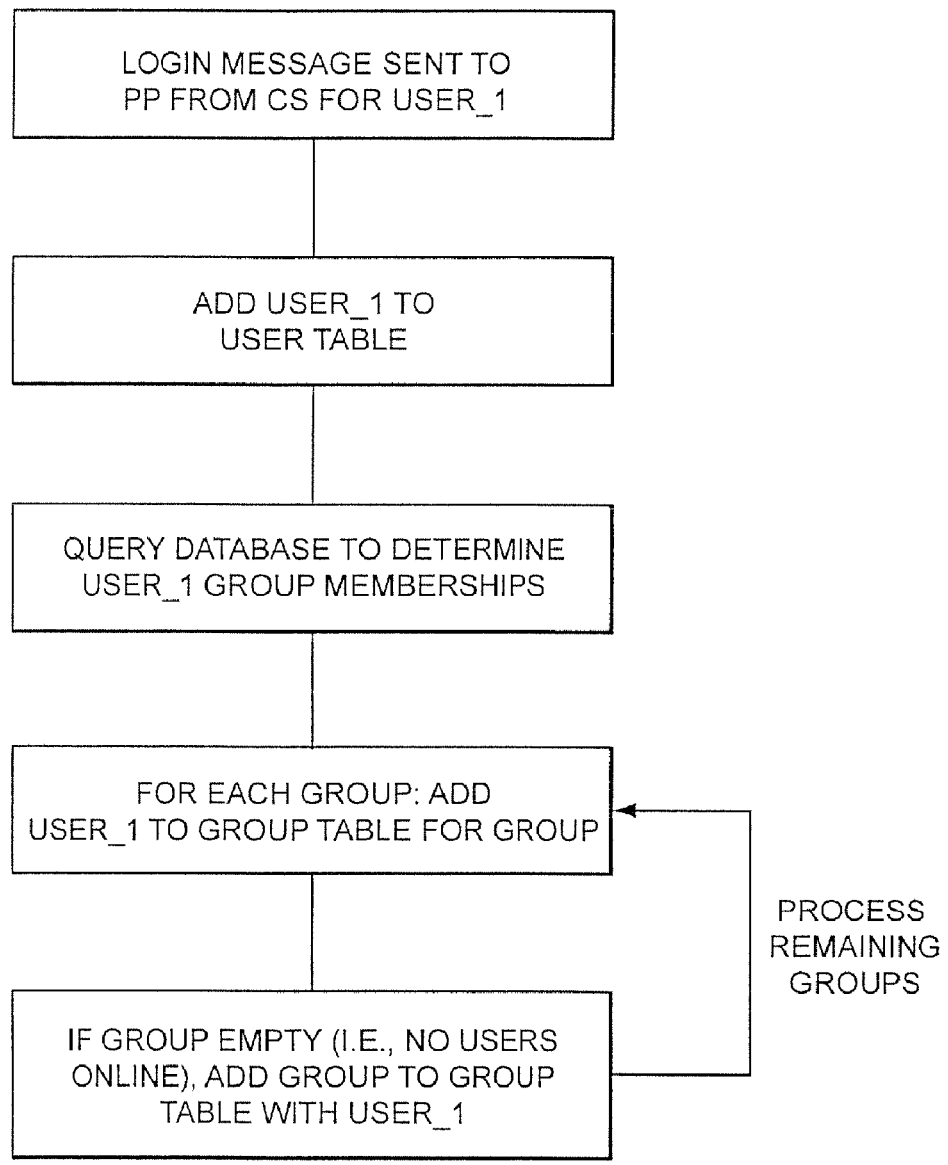
FIG. 5 is a functional flowchart of the steps to login an entity into the presence propagation system in a preferred embodiment of the present invention.

FIG. 5 shows how the UserTable and GroupTable are updated by the PP system when a user logs onto the communication system. First, the chat server 30 that is hosting the user sends a login message to the PP system along with the User IP, Host Box Identifier, Port Number, and Session ID. The PP system adds the user to the UserTable along with the dynamic session information provided by the chat server 30. The PP system then queries the first database 24 to get the list of the groups to which the user belongs as well as the default active group of the user. This additional information is added to the UserTable. Finally, the GroupTable is updated. For each group to which the user belongs, the user is added to the list for that group in the GroupTable. If a group to which the user belongs is not currently in the GroupTable, that group is added to the GroupTable with the user listed as the only online member.

Figure 6:
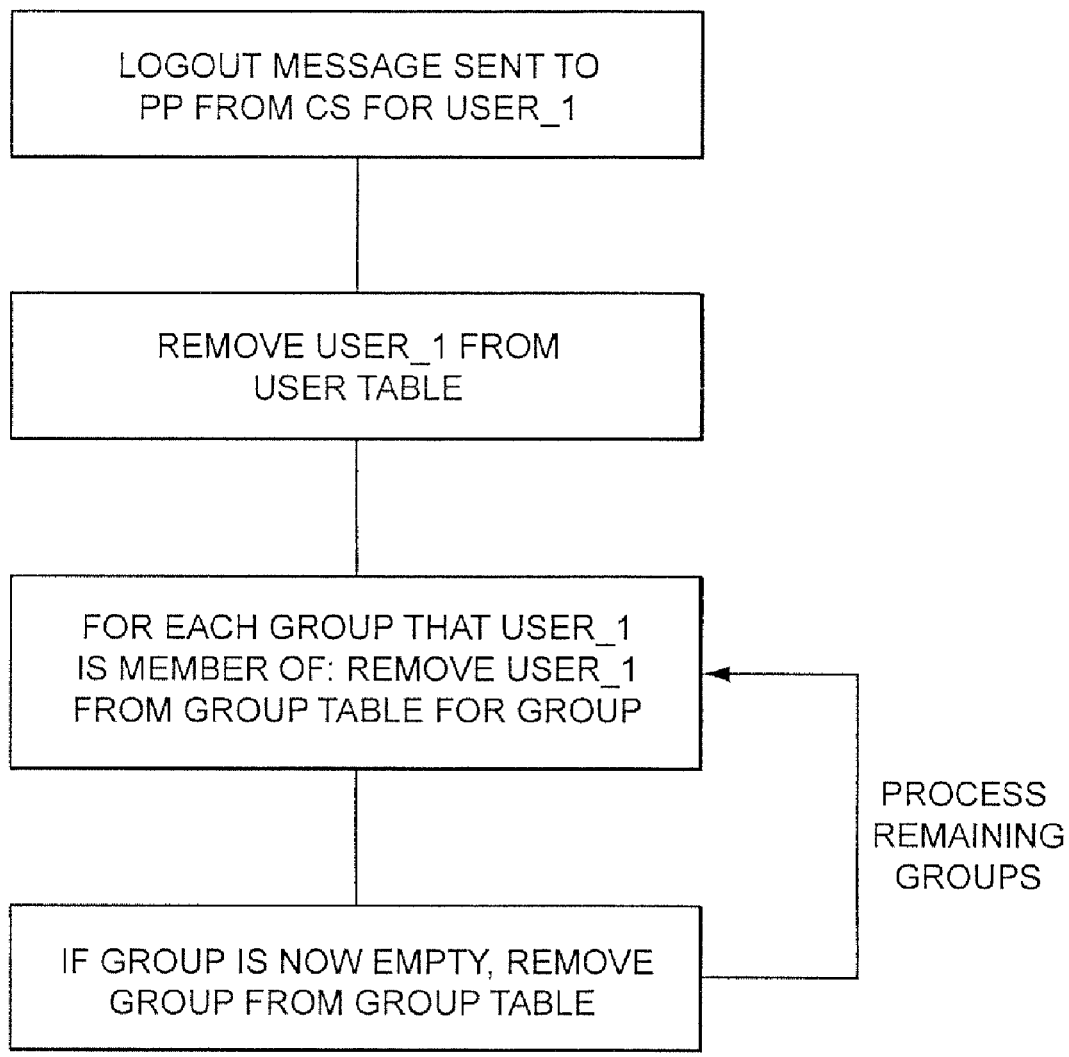
FIG. 6 is a functional flowchart of the steps to logout an entity from the presence propagation system in a preferred embodiment of the present invention.
Figure 7:
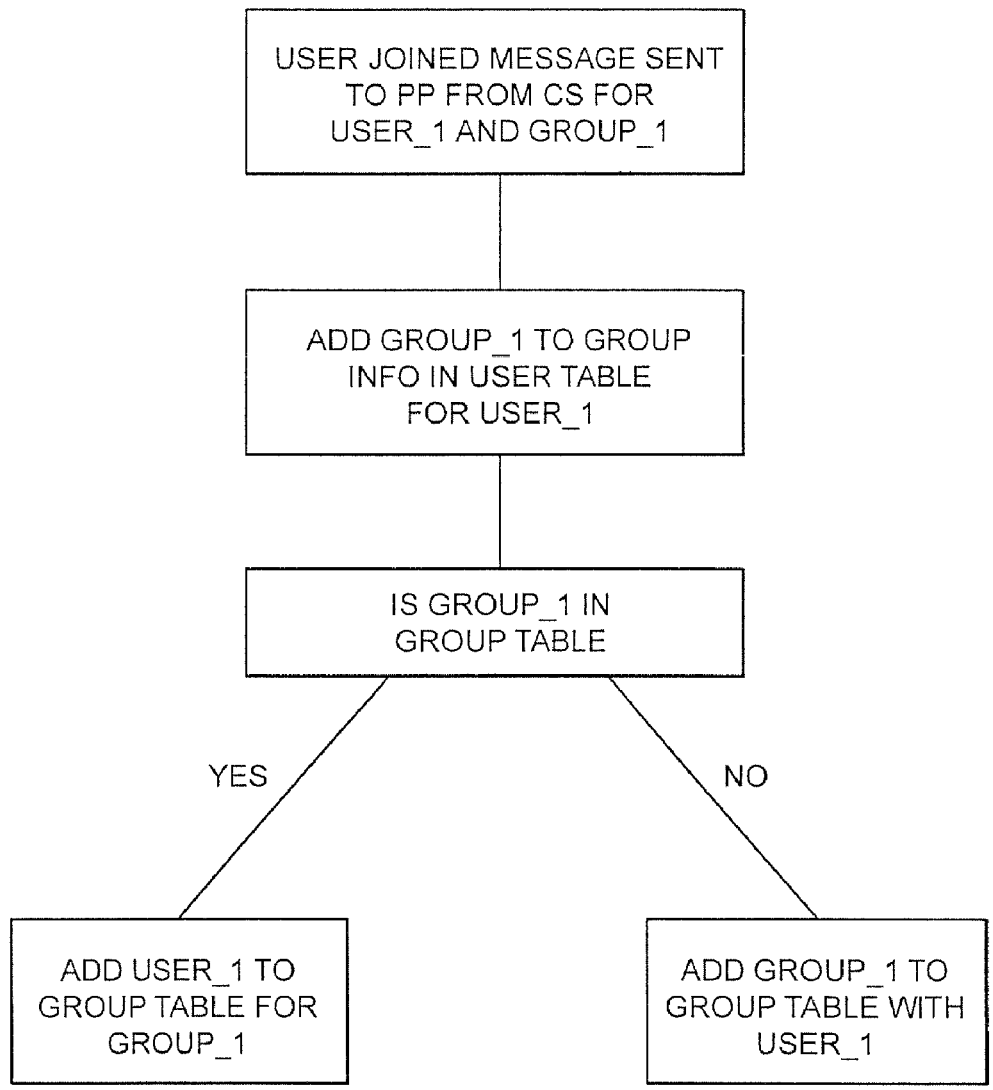
FIG. 7 is a functional flowchart of the steps to join an entity to a group in the presence propagation system in a preferred embodiment of the present invention.
Figure 8:
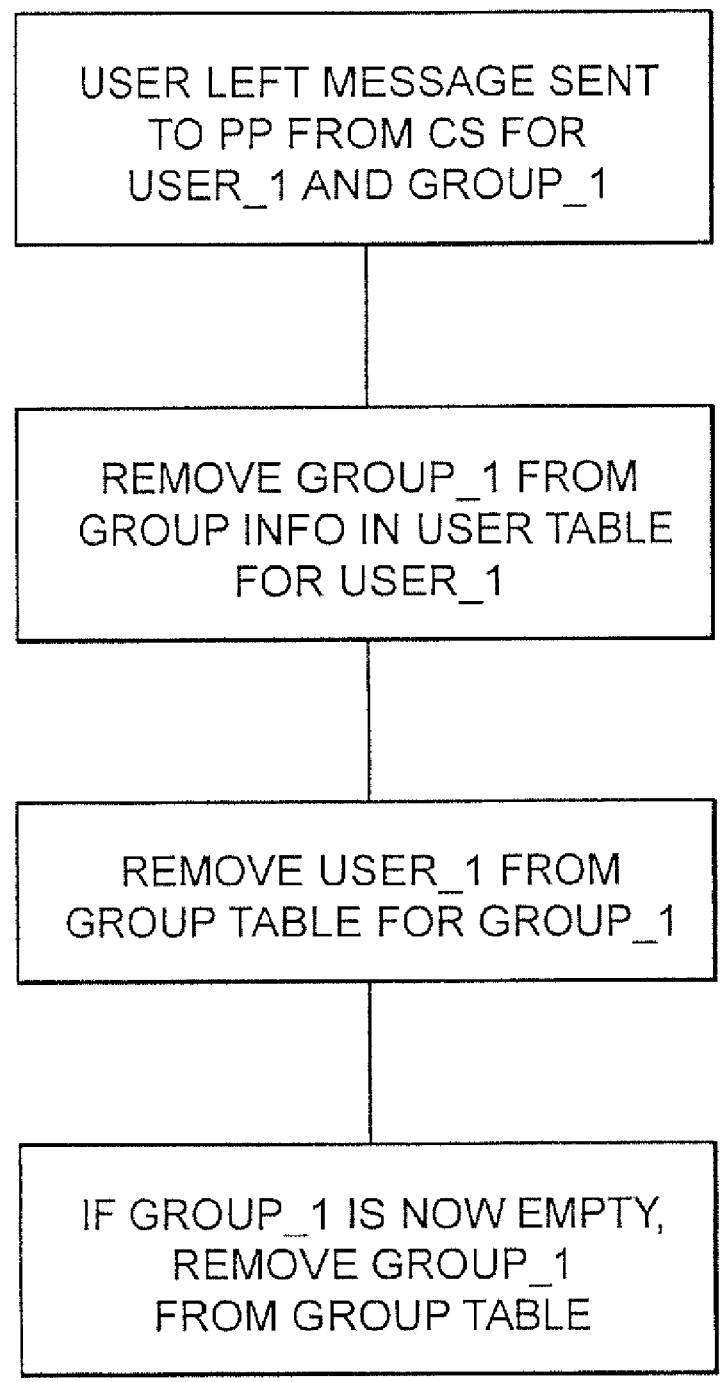
FIG. 8 is a functional flowchart of the steps to remove an entity from a group in the presence propagation system in a preferred embodiment of the present invention.

FIG. 6 shows how the UserTable and GroupTable are updated when a user logs off of the communication system. As previously discussed, the chat server 30 notifies the PP system when a user logs off. FIGS. 7 and 8 show how the UserTable and GroupTable are updated when a user joins a group and when a user leaves a group, respectively. The chat server 30 notifies the backend server 10 about the change in group membership. The first database 24 and the data tables of the second database 26 are updated. Since the procedures of FIGS. 6-8 are very similar to those discussed above for FIG. 5, they are not described in detail here.

Thus, the PP system allows the communication system to track the current online presence of users including the dynamic session information for all online users. The PP system also tracks which groups currently have members online and which members in those groups are currently online. For example, FIG. 9 shows a portion of a UserTable at 10:00 a.m. reflecting three users logged in to the system. User 1 has a set of current dynamic information stored in the UserTable. Similarly, user2 and user3 have their current dynamic session information stored in the UserTable. FIG. 10 represents the same UserTable at 3:00 p.m. As seen in the table, user1 has logged out of the system and has subsequently logged back into the system between 10:00 a.m. and 3:00 p.m. using a different client device 18. Accordingly, the dynamic session information for user1 in the UserTable has changed. User2 has been continuously logged in to the system from the same client device 18, so the dynamic session information in the UserTable for user2 is the same in FIGS. 9 and 10. User3 has logged off of the Internet and has not logged back in. Accordingly, user3 has no current dynamic session information in the UserTable. Finally, user4 has logged in to the system between 10:00 a.m. and 3:00 p.m., and thus has dynamic session information in the UserTable in FIG. 10.

Next, the use of the online presence information, and particularly the dynamic session information, maintained by the PP system in facilitating communication with users of the communications system will be described.

Figure 11:
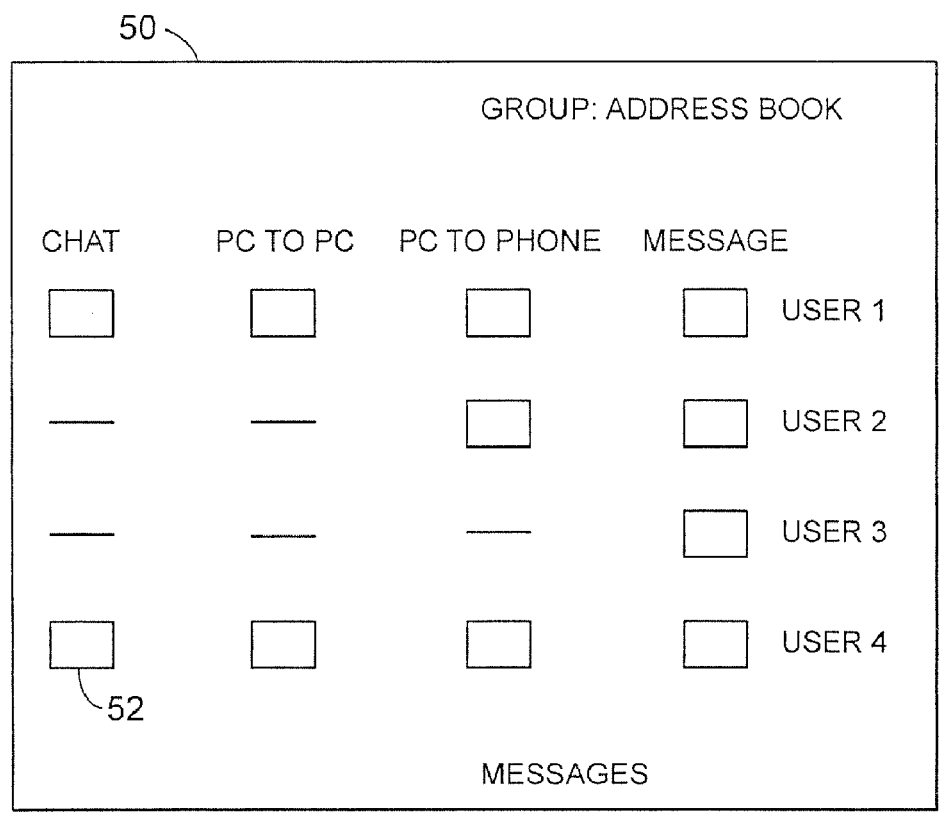

First, when a user logs into the communications system, a web page 36 or 40 is preferably displayed apart from the applet 38 or CCHAT application 44 that establishes and maintains the presence of the user using an HTTP connection. FIG. 11 shows a sample communications web page 50 that would be displayed to user1 after logging into the system. The web page 50 displays the members of user1's active group (in this case, user1's address book) and presents communications options to user 1 based on the online presence of the members of user1's address book. Preferably, four communications options are presented: chat, PC to PC communication, PC to Phone communication, and the ability to leave a message for a user. Of course, a subset of these communications options could be presented, or other communications options could be displayed. Moreover, the web page 50 could also take any form so long as it presents a means (in the form of hyperlinks, images, etc.) to initiate communications options with the user.

Chat is a real-time type chat or instant message capability. It can only be used with a user that is currently online. Thus, in FIG. 11, where user1 and user4 are online, a box appears indicating that user1 can chat with those users. Further, since user2 and user3 are offline, a line appears on the web page 50 rather than a box, indicating that the chat communication format is not available with those users. Clicking on a box on the web page 40 will initiate the chosen communications option with the indicated user. For example, clicking on box 52 will start a chat session with user4. Type chat/instant messaging using the communications system of the current invention will be explained in detail below.

PC to PC communication is real-time voice and/or video conferencing. In order to use this communications option, a client device 18 must be equipped with a sound card and microphone for voice communication and a video camera for video communication. This option is also only available with users that are currently online (e.g., user1 and user4 in FIG. 11). When a user clicks to start a PC to PC call, the communications system launches an appropriate client application on the client device such as Microsoft NetMeeting or another Internet based communications client such as an H323 client or a T120 client. The communications system uses the dynamic session information stored in the UserTable—namely, User IP and possibly Port Number—to put the correct addressing information into the client application to permit the PC to PC call to be connected.

PC to Phone communication is real-time VoIP communication using the gateway 20 to connect voice communication between a client device 18 and a telephone 22 at a telephone number stored in the first database 24. If a user has selected a telephone number where PC to Phone calls should be directed (which is stored in the first database 24), a box will appear in the web page 50, allowing PC to Phone communication to be selected for that user. For example, in FIG. 11, user 1, user3 and user4 have stored phone numbers where they can be reached. A user does not have to be online for a PC to Phone call to be initiated. Thus, in FIG. 11, a box appears for PC to Phone communication with user3, even though user3 is not currently online. When a user clicks to initiate a PC to Phone call, the communications system launches an appropriate client application on the client device 18 such as, for example, Microsoft NetMeeting. The telephone number stored for the user is retrieved from the first database 24 and the call is routed to the telephony network using the gateway 20.

Finally, the message box, which is available for all users whether or not they are currently online, allows a user to leave a text or voice/video message for the indicated user. The message, after being recorded or typed by the user, will be stored for the recipient in the first database 24. The recipient can then retrieve the message and play it back by clicking on the messages link on the recipient's communications web page 50.

FIG. 12 shows how a communications web page 50 is updated when a user logs on, logs off, joins a group or leaves a group. The updates are processed and displayed immediately, giving users of the communications system of the present invention a real-time indication of the online presence of the members of the active group displayed on their communications web pages 50. First, as described above with respect to FIGS. 5-8, the UserTable and GroupTable are updated as a result of a user logging in, logging out, joining a group or leaving a group. Next, the PP system creates an update list of the online member(s) to be notified sorted by session manager server 12 (i.e., host box). To avoid sending unnecessary update information, the PP system checks the Active Group for each member to make sure that the update applies to this group. For example, looking at FIG. 11, if user2 came online and user1's Active Group is the Address Book (as shown in FIG. 11), the update should go to user1. If, however, user1's displayed Active Group was different and if that Active Group did not include user2, then user1 should not receive an update that user2 came online.

Once the update list for each session manager server 12 is created, the lists are sent to the appropriate session manager server 12. Each session manager server 12 receives the update lists for the member(s) it is hosting and places update messages in an update queue for each member that is stored in the chat server 30. The chat server 30 then sends an HTTP encoded update message to the applet 38 or CCHAT application 44 of each member that has an update message stored in its update queue. If the update list was created from a user joining or leaving a group, a refresh update message is sent to the applets 38 or CCHAT applications 44 instead of an update message. For example, looking again at FIG. 11, if user2 comes online and user4 goes offline, the update list sent to the session manager server 12 hosting user1 would include an update message for user1 that user2 came online and user4 went offline. An update message would then be sent to the applet 38 or CCHAT application 44 of the client device 18 for user1.

The update messages are sent from the chat server 30 to the applet 38 or CCHAT application 44 using the same socket and HTTP connection that have been established to maintain the online presence of the member and, as will be explained below, to send other types of messages such as text messages or SIP messages. The update messages can be of any format, but are preferably of the form "msg update updatetype," where updatetype represents the type of update to be performed (e.g., update single user presence, update User IP address, refresh page, etc.)

When an applet 38 or CCHAT application 44 receives a refresh update message, the applet 38 or CCHAT application 44 causes the web page 36 or web page 40, respectively, to refresh. When the web server 28 sends the updated web page 36 or 40, it will include a new line for the user that was added to the displayed active group of the member if a user joined the group. If a user left the group, the updated web page 36 or 40 will have deleted the line for the user that was removed from the displayed active group of the member.

If, however, the applet 38 or CCHAT application 44 receives an update message, it is unnecessary to refresh the entire web page, since the users displayed on the communications web page 50 have not changed. Only the online status of the users has changed, and thus only the boxes displayed on the communications web page 50 need to be changed. Accordingly, upon receiving an update message, the applet 38 or CCHAT application 44 calls update.jsp, a hidden frame on the member's communications web page 50. In response, the web server 28 for the member gets the update messages in the update queue for the member from the chat server 30 and dynamically generates a web page containing JavaScript designed to change the images and links associated with the users that have logged in and out on the member's communications web page 50.

For example, looking again at FIG. 11, in order to process the update messages for user1 that user2 has come online and user4 has gone offline, the web server would generate JavaScript such as:

```
runUpdate( )
{
        change image for chat-user 2
        change link for chat-user 2
        change image for call-user 2
        change link for call-user 2
        change image for chat-user 4
        change link for chat-user 4
        change image for call-user 4
        change link for call-user 4
}
```

The web page generated by the web server 28 is then sent to the member, and the JavaScript runs on-load, which executes the dynamic scripts and updates the links and images on the communications web page 50. For example, if the above JavaScript was sent to the communications web page 50 as shown in FIG. 11, the communications web page 50 would be changed as shown in FIG. 13. User2 is now shown as being online, and the chat and PC to PC options have been activated, while user4 is now shown as being offline and the chat and PC to PC options have been deactivated.

The advantage of performing updates in this manner is that the entire communications web page 50 does not need to be refreshed every time a user comes online or offline. This is particularly advantageous when a user has an Active Group displayed that has many members. Of course, a Java applet within the communications web page 50 could also be used to perform updates in this manner, without the use of JavaScript.

FIG. 19 shows a sample communications web page 50 that would be displayed to user1 after logging in to the system in another preferred embodiment of the communication system of the present invention. The web page 50 is identical to that shown in FIG. 11, except a fifth communication option is presented—PC to wireless device.

PC to wireless device communications is two-way text messaging between a client device 18 and an Internet enabled wireless device. If a user has selected an Internet-enabled wireless device where PC to wireless device communications should be directed (which is stored in the first database 24), a box will appear in the web page 50, allowing PC to wireless device communication to be selected for that user. For example, in FIG. 11, user1, user2 and user4 have stored wireless devices where they can be reached. A user does not have to be online for a PC to wireless device communication to be initiated. Thus, in FIG. 19, a box appears for PC to wireless device communication with user2, even though user2 is not currently online. As with the other communications options described above, clicking on a box on the web page 50 will initiate the chosen communications option with the indicated user. For example, clicking on box 52 will start a PC to wireless device communication with user4. PC to wireless device communication using the communications system of the current invention will be explained in detail below.

The communications system of the present invention also allows requesters that are not registered users of the communications system of the present invention to communicate with users of the system. Every registered user and group gets at least one unique static HTTP URL which is linked with the dynamic session information stored in the second database 26 of the backend server 10. The HTTP URL can thus be used to determine the current online presence of the user associated with the URL as well as facilitate communication with the user associated with the HTTP URL.

The HTTP URL can take any form so long as it uniquely identifies the user or group. For example:

```
http://pxcall.com/username
http://pxcall.com/groupname,
http://pxcall.com/SecondaryName/username,
http://PrimaryName.pxcall.com/SecondaryName/username
``` would all be valid URLs. Additionally, it is possible to have aliases defined, such that multiple HTTP URLs would all be associated with the same user and all perform in the same manner. For example, http://pxcall.com/UserName, http://pxcall.com/UserPhoneNumber and http://pxcall.com/UserEmailAddress could all be associated with the same user and all perform the same when used to determine the current online presence of the user or facilitate communication with the user.

Preferably, the URL is typed into a web browser by the requestor in order for the requester to determine the current online presence of the user associated with the URL or facilitate communication with the user associated with the URL. Of course, the URL can also be used in different manners to achieve the same communication objectives. For example, the URL's can be stored in a user's Favorite List or as Bookmarks. Additionally, the URL's can be placed as hyperlinks on web pages or associated with images or other graphics on web pages and thus can be accessed by clicking on the hyperlink, image or other graphic.

FIGS. 14A and 14B show how a requester uses the HTTP URL. First, the requester enters the URL into a web browser on a client device 18 connected to the Internet or other network, or clicks on or otherwise activates a hyperlink associated with the URL. A redirector (not shown) parses the URL and redirects the client to one of the session manager servers 12 in an appropriate format. For example, http://pxcall.com/username may be translated into http://planetexchange.com/callIjsp?name=username. The redirector provides standard URL redirection and may be located on any server, such as, for example, the backend server 10, the session manager server 12 or some other independent server.

As shown in FIG. 14B, the original URL is passed to the redirector, which translates the URL. The redirector then sends an HTTP 301 Response (redirect URL) to the client along with the translated URL. The client then is directed to the session manager server 12. The web server 28 next queries the first database 24 to see if the user or group sought by the requester requires password access to its communications web page. If so, the requester is prompted to enter a password. If an incorrect password is supplied, the requester is denied access to the communications web page. Otherwise, the web server 28 queries the second database 26 to determine the online presence of the user or the members of the requested group. The web server 28 then presents a communications web page 50 to the client, showing the online presence information and presenting communications options to the requester to facilitate communication with the user or members of the group.

If the requester entered the URL of an individual user, a communications web page 50 such as shown in FIG. 15 will be presented. The web page 50, including the functionality of the links on the page is analogous to that discussed above with respect to FIG. 11. Alternatively, as shown in FIG. 14, if the user is not currently online, the requester may be presented with a web page 50 that only allows the requester to leave a message for the user. For example, such a web page may have a text message or prerecorded voice/video message from the user requesting that a message be left on the page, the web page also presenting links to leave text or voice/video messages.

If the requester entered the URL of a group, a communications web page 50 such as shown in FIG. 16 will be presented. The web page 50, including the functionality of the links on the page is analogous to that discussed above with respect to FIG. 11.

As shown in FIG. 14, after presenting the web page 50 on the requestor's browser, the web server starts a communication applet that is analogous to the applet 38 discussed in detail above. This applet opens a socket and HTTP connection between the web server and the requester's web browser that is analogous to the heartbeat maintained with registered users of the communications system. This socket and HTTP connection are used to facilitate communication with the requestor, particularly for type chat/instant messaging.

As discussed above, one of the forms of communication facilitated by the communications system of the present invention is type chat/instant messaging. This communication option is presented to registered users on their communications web pages 50 as shown in FIG. 11 and is also presented to requesters on their communications web pages 50 as shown in FIGS. 15 and 16. FIG. 17 shows how type chat/instant messaging preferably is carried out using the communications system of the present invention. First, the requester clicks on a link to initiate a chat with a registered user that is currently online. This action causes an HTTP request to be sent to the session manager server 12 hosting the user. This request is of the form: http://hostboxip/initchat?me= . . . to= . . . id= . . . , where me is the requester, to is the recipient and id is the session id of the requestor. The chat server 30 on the session manager server 12 hosting the user writes an initChat message to be sent the applet 38 or CCHAT application 44 on the client device 18 of the user. This message is preferably of the form "msg initChat" although it can be of any form. Similarly, the chat server 30 on the session manager server 12 hosting the requester writes an initChat message to be sent the applet 38 or CCHAT application 44 on the client device 18 of the user. If the requester is not a registered user, then the message will be sent to the applet 38 associated with the requestor's web browser. The initChat messages cause the applet 38 or CCHAT application 44 to open a chat window or box on the client device 18 of the user and requestor.

Chat messages are sent to the chat server 30 on the session manager server 12 of the receiving party using HTTP requests that are preferably of the form HTTP POST to/chat with elements me= . . . , msg=text message, where me is the sender, sessionID is the session ID of the sender and msg is the text message to be sent. These requests open a new socket for the transmission that is immediately closed after the post. The chat messages are received by the chat server 30, where they are relayed to the receiving party by writing the bytes to the socket as part of the HTTP response that is the user connection between the chat server 30 and the applet 38 or CCHAT application 44. Upon receipt, the chat message is displayed in the chat window or box.

Preferably, upon receipt of the message, the socket, and thus the HTTP connection between the receiving party and the chat server 30, is closed. The receiving party reestablishes its socket connection to the chat server 30 via another HTTP connection using the same process to establish a connection as explained above. Of course, the existing socket could be kept open, thereby removing the need to reestablish the socket and HTTP connection.

The type chat/instant messaging of the communications system of the present invention is advantageous in that it is completely HTTP based. Accordingly, it will allow messages to be sent to any client device 18, whether or not it is behind a proxy server or firewall. Moreover, the type chat/instant messaging does not require any proprietary download or proprietary format for the transmission of messages or the determination of the online presence information of the parties. The system is thus completely open and can be used by any client device 18 with a web browser connected to a network.

As discussed above, another one of the forms of communication facilitated by the communications system of the present invention is two-way text messaging with Internet enabled wireless devices. This communication option is presented to registered users on their communications web pages 50 as shown in FIG. 19 and could also be presented to requesters on their communications web pages 50 such as those shown in FIGS. 15 and 16. FIG. 20 shows how text messaging with Internet enabled wireless devices preferably is carried out using the communications system of the present invention. First, the requestor clicks on a link to initiate two-way text messaging with a wireless device. This action causes an initChat message to be sent from the chat server 30 hosting the requester to the wireless device that includes an URL that identifies the chat server 30. This message is sent to the wireless device using a wireless telephony network. For example, the message can be sent to a Wireless Application Protocol (WAP) Gateway such as phone.com. Alternatively, the message can be sent to the wireless device using Short Message Service (SMS) messaging.

The chat server 30 next checks to see if the message is successfully delivered to the wireless device. If not, the chat server 30 sends a message to the requestor that the wireless device is not available. If the message is delivered, the chat server 30 sends an initChat message to the applet 38 or CCHAT application 44 on the client device 18 of the requestor. This message is the same as described above with respect to type chat in order to open a chat window or box on the client device 18 of the requestor.

The user of the wireless device can then respond to the initChat message sent to the wireless device to initiate two-way messaging with the requestor. The wireless device responds by making an HTTP request to the URL sent in the initChat message. This request can be made, for example, using a WML/HDML browser on the wireless device. The request is used to establish and maintain a socket between the wireless device and the chat server 30 using the identical process as explained above with respect to other client devices 18. The socket is also maintained using the same method as described above. Messages can then be sent back and forth between the requester and the wireless device using HTTP requests as described above with respect to type chat/ instant messaging. The messages are displayed in the requestor's chat window or box, and are displayed on the wireless device using appropriate WML/HDML formatting.

The socket and HTTP connection established between a chat server 30 and the applet 38 or CCHAT application 44 on the client device 18 of a registered used can also be used to transport other types of information across proxy servers and firewalls that otherwise would not be able to cross such barriers. For example, Session Initiation Protocol (SIP) has generated a tremendous amount of recent interest. However, SIP messages cannot pass through a proxy server/firewall barrier, as they can be either UDP or TCP based. The communications system of the present invention could be used to provide a means of transporting SIP messages across a proxy server/firewall. FIG. 18 shows how the transportation of SIP messages preferably is carried out using the communications system of the present invention. The chat server 30, which is placed outside of a user's proxy server/firewall, can act as a SIP proxy for the user. As shown in FIG. 18, the chat server 30 receives a SIP request for the user. The chat server 30 then relays the request to the user using the socket and HTTP connection with the user as described above. For example, the chat server 30 preferably sends a message of the form "msg siprep reqtype", where reqtype is the type of SIP request received by the chat server 30. When this message is received by the applet 38 or CCHAT application 44 on the client device 18 of the user, the applet 38 or CCHAT application 44 could then execute some form of SIP client application on the client device 18 to respond/process the SIP request. Of course, the SIP functionality could be built into the applet 38 or CCHAT application 44 rather than a separate application. In this way, SIP messages can be sent to users using HTTP connections and thus can pass across a proxy server/firewall.

The present invention may be implemented with any combination of hardware and software. If implemented as a computer-implemented apparatus, the present invention is implemented using means for performing all of the steps and functions described above. The present invention also can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A computer implemented method of using HTTP to transport a message between a first client device to a second client device over a network, the method comprising:
    receiving a first HTTP request initiated from a first client device at a server;
    establishing a first socket and a first HTTP connection between the first client device and the server;
    receiving the message from the first client device at the server using the first socket and the first HTTP connection;
    receiving a second HTTP request initiated from a second client device to the server;
    establishing and maintaining a second socket and a second HTTP connection between the second client device and the server; and
    delivering the message from the first client device to the second client device using the second socket and the second HTTP connection as a response to the second HTTP request from the second client device to the server.

2. A method as in claim 1 further comprising displaying the message.

3. A method as in claim 2 wherein said message comprises a text, chat, instant or SIP message.

4. A method as in claim 2 wherein said message comprises a reply message.

5. A method as claim 4 wherein said reply message comprises a text, chat, instant or SIP message.

6. A method as in claim 1 wherein said message comprises a text, chat, instant or SIP message.

7. A method as in claim 1 wherein said message comprises a reply message.

8. A method as claim 7 wherein said reply message comprises a text, chat, instant or SIP message.

9. A method as in claim 1 wherein said network comprises a wireless telephony network and said second client device comprises an Internet enabled wireless device.

10. A method as in claim 1 wherein the first client device is an Internet enabled wireless device.

11. A method as in claim 1 wherein the second client device is an Internet enabled wireless device.

12. A method as in claim 11 further comprising delivering a second message from the Internet enabled wireless device to the first client device.

13. A method as in claim 12 wherein said second message comprises a reply message.

14. A method as in claim 13 wherein said second message comprises a text, chat, instant or SIP message.

15. A method as in claim 12 wherein said second message comprises a text, chat, instant or SIP message.

16. A method as in claim 12 further comprising receiving at the server said second message from the Internet enabled wireless device using the second socket and HTTP connection.

17. A method as in claim 12 further comprising displaying the second message.

18. A method as in claim 17 wherein said second message comprises a reply message.

19. A method as in claim 18 wherein said second message comprises a text, chat, instant or SIP message.

20. A method as in claim 17 wherein said second message comprises a text, chat, instant or SIP message.

21. An article of manufacture for using HTTP to transport a message between a first client device to a second client device over a network, the article of manufacture comprising computer-readable storage media holding computer-executable instructions stored in computer memory for a method comprising:
    receiving a first HTTP request initiated from a first client device at a server;
    establishing a first socket and a first HTTP connection between the first client device and the server;
    receiving the message from the first client device at the server using the first socket and the first HTTP connection;
    receiving a second HTTP request initiated from a second client device to the server,
    establishing and maintaining a second socket and a second HTTP connection between the second client device and the server; and
    delivering the message from the first client device to the second client device using the second socket and the second HTTP connection as a response to the second HTTP request from the second client device to the server.

22. An article of manufacture as in claim 21 further comprising displaying the message.

23. An article of manufacture as in claim 22 wherein said message comprises a text, chat, instant or SIP message.

24. An article of manufacture as in claim 22 wherein said message comprises a reply message.

25. An article of manufacture as in claim 24 wherein said reply message comprises a text, chat, instant or SIP message.

26. An article of manufacture as in claim 21 wherein said message comprises a text, chat, instant or SIP message.

27. An article of manufacture as in claim 21 wherein said message comprises a reply message.

28. An article of manufacture as in claim 27 wherein said reply message comprises a text, chat, instant or SIP message.

29. An article of manufacture as in claim 21 wherein said network comprises a wireless telephony network and said second client device comprises an Internet enabled wireless device.

30. An article of manufacture as in claim 21 wherein the first client device is an Internet enabled wireless device.

31. An article of manufacture as in claim 21 wherein the second client device is an Internet enabled wireless device.

32. An article of manufacture as in claim 31 further comprising delivering a second message from the Internet enabled wireless device to the first client device.

33. An article of manufacture as in claim 32 wherein said second message comprises a reply message.

34. An article of manufacture as in claim 33 wherein said second message comprises a text, chat, instant or SIP message.

35. An article of manufacture as in claim 32 wherein said second message comprises a text, chat, instant or SIP message.

36. An article of manufacture as in claim 32 further comprising receiving at the server said second message from the Internet enabled wireless device using the second socket and HTTP connection.

37. An article of manufacture as in claim 32 further comprising displaying the second message.

38. An article of manufacture as in claim 37 wherein said second message comprises a reply message.

39. An article of manufacture as in claim 38 wherein said second message comprises a text, chat, instant or SIP message.

40. An article of manufacture as in claim 37 wherein said second message comprises a text, chat, instant or SIP message.

* * * * *